(12) United States Patent
Wendland et al.

(10) Patent No.: US 10,960,341 B2
(45) Date of Patent: *Mar. 30, 2021

(54) AIR FILTERS COMPRISING POLYMERIC SORBENTS FOR ALDEHYDES

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US); Himanshu Jasuja, St. Paul, MN (US); Andrew R. Fox, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/083,823

(22) PCT Filed: Mar. 10, 2017

(86) PCT No.: PCT/US2017/021856
§ 371 (c)(1),
(2) Date: Sep. 10, 2018

(87) PCT Pub. No.: WO2017/160650
PCT Pub. Date: Sep. 21, 2017

(65) Prior Publication Data
US 2020/0298170 A1    Sep. 24, 2020

Related U.S. Application Data

(60) Provisional application No. 62/307,831, filed on Mar. 14, 2016, provisional application No. 62/465,221, filed on Mar. 1, 2017.

(51) Int. Cl.
*B01D 39/16* (2006.01)
*B01D 46/00* (2006.01)
(Continued)

(52) U.S. Cl.
CPC ..... *B01D 53/0407* (2013.01); *B01D 39/1623* (2013.01); *B01J 20/267* (2013.01);
(Continued)

(58) Field of Classification Search
CPC .......................... B01D 53/04; B01D 53/0407; B01D 39/1623; B01D 2239/0407;
(Continued)

(56) References Cited

U.S. PATENT DOCUMENTS 3,799,870 A   3/1974 Heilweil
4,029,597 A   6/1977 Neisius
(Continued)

FOREIGN PATENT DOCUMENTS

CN    102600718    7/2012
CN    104587980    5/2015
(Continued)

OTHER PUBLICATIONS

Extended European Search Report, EP17767213.6, dated Oct. 9, 2019, 3 pages.
(Continued)

*Primary Examiner* — Frank M Lawrence, Jr.
(74) *Attorney, Agent, or Firm* — Kenneth B. Wood

(57) ABSTRACT

An air filter including a filter support that supports polymeric sorbent particles. The polymeric sorbent is the reaction product of a divinylbenzene/maleic anhydride precursor polymeric material with a nitrogen-containing compound.

30 Claims, 6 Drawing Sheets

(51) Int. Cl.
  *B01D 53/04* (2006.01)
  *B01J 20/26* (2006.01)
  *B01J 20/28* (2006.01)

(52) U.S. Cl.
  CPC . *B01J 20/28028* (2013.01); *B01D 2239/0407* (2013.01); *B01D 2239/0492* (2013.01); *B01D 2253/202* (2013.01); *B01D 2257/70* (2013.01)

(58) Field of Classification Search
  CPC ........ B01D 2239/0492; B01D 2257/70; B01D 2253/202; B01J 20/267; B01J 20/28028
  USPC .............. 95/141; 96/134, 154; 502/401, 402
  See application file for complete search history.

(56) References Cited

U.S. PATENT DOCUMENTS

| | | | |
|---|---|---|---|
| 4,273,751 A | 6/1981 | Sinha | |
| 4,296,166 A | 10/1981 | Ogino | |
| 4,411,948 A | 10/1983 | Ogino | |
| 4,443,354 A | 4/1984 | Eian | |
| 4,588,537 A | 5/1986 | Klaase | |
| 4,677,096 A | 6/1987 | Van der Smissen | |
| 4,798,575 A | 1/1989 | Siversson | |
| 4,798,850 A | 1/1989 | Brown | |
| 4,976,677 A | 12/1990 | Siversson | |
| 5,033,465 A | 7/1991 | Braun | |
| 5,081,111 A | 1/1992 | Akimoto et al. | |
| 5,124,177 A | 6/1992 | Kasmark, Jr. | |
| 5,174,938 A | 12/1992 | Ito | |
| 5,332,426 A | 7/1994 | Tang | |
| 5,338,340 A | 8/1994 | Kasmark, Jr. | |
| 5,389,175 A | 2/1995 | Wenz | |
| 5,496,507 A | 3/1996 | Angadjivand | |
| 5,580,624 A | 12/1996 | Andersen | |
| 5,616,169 A | 4/1997 | De Ruiter | |
| 5,779,847 A | 7/1998 | Groeger | |
| 5,871,569 A | 2/1999 | Oehler | |
| 6,004,584 A | 12/1999 | Peterson | |
| 6,010,766 A | 1/2000 | Braun et al. | |
| 6,024,782 A | 2/2000 | Freund | |
| 6,126,707 A | 10/2000 | Pitzen | |
| 6,344,071 B1 | 2/2002 | Smith | |
| 6,391,429 B1 | 5/2002 | Senkus | |
| 6,423,123 B1 | 7/2002 | Rosenberg | |
| 6,432,872 B1 | 8/2002 | Tsushio | |
| 6,534,611 B1 | 3/2003 | Darling et al. | |
| 6,645,271 B2 | 11/2003 | Seguin | |
| 6,767,460 B1 | 7/2004 | Clough | |
| 6,840,986 B1 | 1/2005 | Koslow | |
| 6,930,219 B2 | 8/2005 | Shan | |
| 7,052,533 B2 | 5/2006 | Nakahara | |
| 7,063,733 B2 | 6/2006 | Mori | |
| 7,235,115 B2 | 6/2007 | Duffy | |
| 7,309,513 B2 | 12/2007 | Brey | |
| 7,503,953 B2 | 3/2009 | Sundet | |
| 7,559,981 B2 | 7/2009 | Friday | |
| 7,947,142 B2 | 5/2011 | Fox | |
| 7,955,570 B2 | 6/2011 | Insley | |
| 8,240,484 B2 | 8/2012 | Fox | |
| 8,268,736 B2 | 9/2012 | Varga-Molnar | |
| 8,470,074 B2 | 6/2013 | Baugh | |
| 8,556,089 B2 | 10/2013 | Kalayci et al. | |
| 8,834,759 B2 | 9/2014 | Lalouch | |
| 9,776,131 B2 | 10/2017 | Eisenberger | |
| 10,654,026 B1 | 5/2020 | Wendland | |
| 2003/0041733 A1 | 3/2003 | Seguin | |
| 2003/0064237 A1 | 4/2003 | Oishi | |
| 2003/0144421 A1 | 7/2003 | Dixon | |
| 2004/0163540 A1 | 8/2004 | Mori | |
| 2005/0004065 A1 | 1/2005 | Feinstein | |
| 2005/0092176 A1 | 5/2005 | Ding | |
| 2006/0032371 A1 | 2/2006 | Dauber | |
| 2006/0042209 A1 | 3/2006 | Dallas et al. | |
| 2006/0254427 A1 | 11/2006 | Trend | |
| 2007/0163588 A1 | 7/2007 | Hebrank et al. | |
| 2008/0319097 A1 | 12/2008 | Johannsen | |
| 2009/0060809 A1 | 3/2009 | Shioya | |
| 2009/0293279 A1 | 12/2009 | Sebastian | |
| 2012/0272828 A1 | 11/2012 | Dallas | |
| 2012/0272829 A1 | 11/2012 | Fox | |
| 2012/0312734 A1 | 12/2012 | Kalayci | |
| 2013/0048853 A1* | 2/2013 | Nunoshige | C08F 212/36 250/288 |
| 2013/0101477 A1 | 4/2013 | Both | |
| 2013/0189166 A1 | 7/2013 | Thomas | |
| 2013/0312605 A1 | 11/2013 | Hufen | |
| 2014/0186250 A1 | 7/2014 | Levan | |
| 2015/0252566 A1 | 9/2015 | Tangeman | |
| 2015/0306536 A1 | 10/2015 | Billingsley | |
| 2017/0120219 A1 | 5/2017 | Diamond | |
| 2017/0333870 A1 | 11/2017 | Wendland | |
| 2019/0054447 A1 | 2/2019 | Kobe | |
| 2019/0060870 A1 | 2/2019 | Kobe | |

FOREIGN PATENT DOCUMENTS

| | | |
|---|---|---|
| DE | 4034798 | 5/1992 |
| EP | 0432438 | 6/1991 |
| EP | 0800863 | 10/1997 |
| EP | 1279435 | 1/2003 |
| GB | 1066480 | 4/1967 |
| JP | 50144680 | 11/1975 |
| JP | 63274429 | 11/1988 |
| JP | 11254958 | 9/1991 |
| JP | 057725 | 1/1993 |
| JP | 10204384 | 8/1998 |
| JP | 11226338 | 8/1999 |
| WO | WO 00/25616 | 5/2000 |
| WO | WO 2001-41901 | 6/2001 |
| WO | WO 2003-015914 | 2/2003 |
| WO | WO 2010/074909 A1 | 7/2010 |
| WO | WO 2011-035195 | 3/2011 |
| WO | WO 2015-034799 | 3/2015 |
| WO | WO 2015-095110 | 6/2015 |
| WO | WO 2015-095115 | 6/2015 |
| WO | WO 2016-186858 | 11/2016 |
| WO | WO 2016-205083 | 12/2016 |
| WO | WO 2016-205444 | 12/2016 |
| WO | WO 2017-106434 | 6/2017 |
| WO | WO 2017-106438 | 6/2017 |
| WO | WO 2017-106443 | 6/2017 |
| WO | WO 2017-160634 | 9/2017 |
| WO | WO 2017-160646 | 9/2017 |
| WO | WO 2017-160650 | 9/2017 |

OTHER PUBLICATIONS

Arean, "Carbon dioxide and nitrogen adsorption on porous copolymers of divinylbenzene and acrylic acid", Adsorption, Apr. 2013, vol. 19, No. 2-4, pp. 367-372.

Bicak, "Aldehyde Separation by Polymer-Supported Oligo (ethyleneimines)", Journal of Polymer Science Part A Polymer Chemistry, Jul. 1997, vol. 35, No. 14, pp. 2857-2864, XP55027595.

Bottcher, "Silica Sol-Gel Glasses with Embedded Organic Liquids", Advanced Materials, Feb. 1999, vol. 11, No. 2, pp. 138-141.

Carta, "Novel Spirobisindanes for Use as Precursors to Polymers of Intrinsic Microporosity", Organic Letters, 2008, vol. 10, No. 13, pp. 2641-2643.

Cecile, "Hydrophilic Polystyrene/Maleic Anhydride Ultrafine Fibrous Membranes", Journal of Applied Polymer Science, Jan. 2010, vol. 115, No. 2, pp. 723-730.

Chen, "Stability and Equilibrium Properties of Macroreticular Resins for Flue Gas Desulfurization", Industrial and Engineering Chemistry Research; 1990, vol. 29, No. 3, pp. 440-447, XP055356157.

Chowdhury, "Synthesis and characterization of radiation grafted films for removal of arsenic and some heavy metals from contaminated water", Radiation Physics and Chemistry, Oct. 2012, vol. 81, No. 10, pp. 1606-1611.

Croll, "Formation of Tectocapsules by Assembly and Cross-linking of Poly(divinylbenzene-alt-maleic anhydride) Spheres at the Oil-

(56) References Cited

OTHER PUBLICATIONS

Water Interface", Langmuir, May 2003, vol. 19, No. 14, pp. 5918-5922, XP055355244.
Gorka, "KOH activation of mesoporous carbons obtained by soft-templating", Carbon, Jul. 2008, vol. 46, No. 8, pp. 1159-1161.
Harada, "Removal of primary and secondary amines by reaction gas chromatography using porous maleic anhydride—divinylbenzene copolymer beads", Kumamoto University, Jul. 1982, vol. 31, pp. 697-701.
Kaliva, "Microporous Polystyrene Particles for Selective Carbon Dioxide Capture", Langmuir, Feb. 2012, vol. 28, No. 5, pp. 2690-2695.
Niu, "Highly dispersed Ru on K-doped meso-macroporous $SiO_2$ for the preferential oxidation of CO in H2-rich gases", International Journal of Hydrogen Energy, 2014, vol. 39, No. 25, pp. 13800-13807.
Ogawa, "Preparation of Spherical Polymer Beads of Maleic Anhydride-Styrene-Divinylbenzene and Metal Sorption of its Derivatives", Journal of Applied Polymer Science, 1984, vol. 29, No. 9, pp. 2851-2856.
Okay, "Porous Maleic Anhydride-Styrene-Divinylbenzene Copolymer Beads", Journal of Applied Polymer Science, Jul. 1987, vol. 34, pp. 307-317, XP055356037.
Song, "Coordination of Metal Cations with Amino-Functionalized MCM-41 for Adsorptive Desulfurization", Advanced Materials Research, 2014, vol. 926-930, pp. 4222-4225.
Woodward, "Swellable, Water- and Acid-Tolerant Polymer Sponges for Chemoselective Carbon Dioxide Capture", Journal of the American Chemical Society, 2014, vol. 136, No. 25, pp. 9028-9035.
Yan, "In situ growth of a carbon interphase between carbon fibres and a polycarbosilane-derived silicon carbide matrix", Carbon, 2011, vol. 49, No. 8, pp. 2869-2877.
Yang, "A Pervaporation Study of Ammonia Solutions Using Molecular Sieve Silica Membranes", Membranes, 2014, vol. 4, No. 1, pp. 40-54.
Yim, "Removal of Formaldehyde Over Amine Functionalized SBA-15", Journal of Nanoscience and Nanotechnology, 2011, vol. 11, No. 2, pp. 1714-1717.
International Search Report for PCT International Application No. PCT/US2017/021856, dated Jun. 16, 2017, 4 pages.

* cited by examiner

AIR FILTERS COMPRISING POLYMERIC SORBENTS FOR ALDEHYDES

BACKGROUND

It is often desired to remove gaseous substances such as, e.g., formaldehyde, from air.

SUMMARY

In broad summary, herein are disclosed air filters comprising filter supports that comprise polymeric sorbent particles. The polymeric sorbent is the reaction product of a divinylbenzene/maleic anhydride precursor polymeric material with a nitrogen-containing compound. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

DETAILED DESCRIPTION

Glossary

The term "air filter" denotes any apparatus or device in which a herein-described polymeric sorbent, supported by a filter support, is presented to air, e.g. a stream of moving air, so that a gaseous substance can be removed from the air. The term "filter support" denotes any structure that can retain sorbent particles and present them to, e.g., a stream of moving air, but that does not necessarily perform any filtration of microscopic particles from moving air. The term "filter media" denotes a filter support that is itself capable of filtering microscopic particles. A "microscopic" particle is a particle with an average diameter (or equivalent diameter, in the case of non-spherical particles) of less than 100 microns. A "fine" particle is a particle with an average diameter or equivalent diameter of less than 10 microns.

The terms "polymeric sorbent" and "porous polymeric sorbent" are used interchangeably to refer to a polymeric material that is porous and that can sorb gaseous substances such as, for example, aldehydes. Porous materials such as the polymeric sorbents can be characterized based on e.g. the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers.

The term "upstream" is applicable to a circumstance in which a filter is exposed to moving air, and refers to the direction from which moving air encounters a filter; "downstream" refers to the direction in which filtered air exits a filter.

The term "netting" refers to a filter support that is comprised of relatively few layers (five or less, often one) of solid material, e.g. filaments.

The term "fibrous web" refers to a filter support that is comprised of numerous layers (e.g., more than five) of fibers.

The term "meltblown" refers to fibers (and the resulting fibrous webs) that are formed by extruding molten polymer streams into converging high velocity air streams introduced by way of air-blowing orifices located in close proximity to the extrusion orifices. The skilled person will appreciate that meltblown fibers and webs will characteristically exhibit features and signatures (e.g., differences in the orientation of the molecules of the material making up the fibers, as revealed e.g. by optical properties such as birefringence, melting behavior, and so on) by which such fibers and webs can be identified and distinguished from other types of web.

Figure 1:
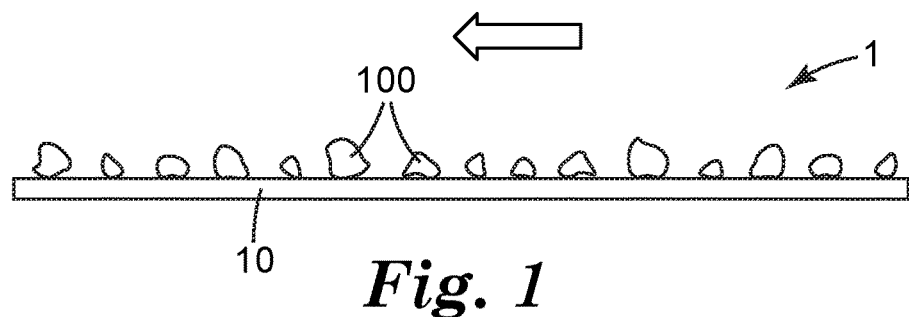
FIG. 1 depicts a portion of an exemplary air filter comprising a filter support comprising sorbent particles as disclosed herein.

Disclosed herein is an air filter 1 as shown in generic representation in FIG. 1. Air filter 1 can be any apparatus or device that exposes herein-disclosed polymeric sorbent particles 100 to air, e.g. to a stream of moving air (with the general direction of airflow indicated in exemplary embodiment by the block arrow in FIG. 1 and in other Figures) so that a gaseous substance, e.g. an aldehyde such as formaldehyde, can be removed from the air.

Air filter 1 comprises at least one filter support 10. A filter support 10 can be any structure that supports sorbent particles 100 in such manner that exposes them to air, while retaining the sorbent particles so that, if the air is moving, the sorbent particles are not dislodged by the moving air. If the air is moving, it may encounter individual sorbent particles while in laminar flow or while in turbulent flow, or may transition between flow regimes in, for example, passing through a collection of sorbent particles. In embodiments of one general type, filter support 10 may take the form of a substrate on which sorbent particles 100 are provided (e.g., are attached to a major surface thereof) and across which e.g. a moving stream of air may traverse, as shown in generic representation in FIG. 1. In some embodiments of this type, filter support 10 may retain sorbent particles 100 e.g. by way of the sorbent particles being attached (e.g., adhesively bonded) to the filter support. In embodiments of another general type, a filter support 10 may retain sorbent particles 100 e.g. by mechanically retaining the sorbent particles within the filter support, as shown in generic representation in FIG. 2. (In other words, in such embodiments the sorbent particles may not necessarily be attached to the filter support, but the filter support can physically block the sorbent particles from being dislodged and removed from the filter support.) In some embodiments, a combination of mechanical retention, and attachment (e.g. bonding), of sorbent particles to the filter support may be employed.

In some embodiments, an air filter 1 may be (e.g., may consist essentially of) a filter support 10 comprising sorbent particles 100 (for example, a freestanding piece of such a filter support could be installed into e.g. a room air purifier). In other embodiments, an air filter 1 may comprise (in addition to the at least one filter support 10) other layers as desired for any purpose, and/or may additionally comprise any other ancillary components such as e.g. a perimeter frame, one or more reinforcing or stabilizing members, one or more housing pieces, and so on. Various specific exemplary embodiments and arrangements are discussed in detail later herein.

As noted with reference to FIG. 1, in some embodiments a filter support may take the form of a substrate (which substrate may be air impermeable, or air permeable) on a major surface of which sorbent particles 100 are disposed, e.g. attached. Air filters of this type may comprise, for example, a planar substrate bearing sorbent particles attached to a major surface thereof; a hollow tube with sorbent particles attached to an interior surface thereof; or, an array of flow-through channels provided by stacked or nested microstructured substrates (e.g., of the general type described in U.S. Pat. No. 7,955,570 to Insley) with sorbent particles attached to interior surfaces of the flow-through channels; and so on. In some embodiments sorbent particles 100 may be provided at least substantially as a monolayer on a surface of the substrate (e.g. as shown in FIG. 1), except for such occasional stacking as may occur statistically e.g. in any industrial-scale deposition process.

Figure 2:
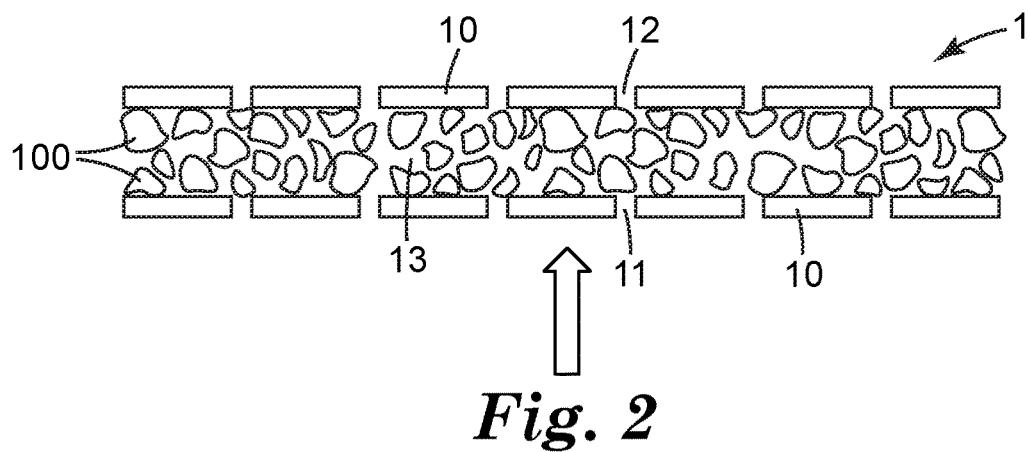
FIG. 2 depicts a portion of another exemplary air filter.

With reference to FIG. 2, the term filter support broadly encompasses any container that is designed to retain sorbent particles 100 therein and that includes at least one air inlet 11 for admitting air to the interior 13 of the container and at least one air outlet 12 to allow treated air to leave the container. Such supports of this general type may include well known filter cartridges in which sorbent particles 100 are retained within a cartridge housing made of e.g. one or more injection molded housing parts. In such filter cartridges, a single air inlet and/or outlet may be provided; or, a number of through-apertures may be provided in the filter cartridge housing to collectively provide an air inlet or outlet. Such through-apertures may be of appropriate size to prevent sorbent particles from passing therethrough; and/or, in some embodiments, an air-permeable protective layer (e.g., a screen or mesh) may be provided to ensure that the sorbent particles are retained within the cartridge housing. In some embodiments a filter support may be impermeable to air (e.g., may contain no through-apertures) in the locations of the support that are proximate to (e.g., that support and retain) sorbent particles, as in the design of FIG. 1. In other embodiments, a filter support may be permeable to air (e.g., may include one or more through-apertures) in locations of the support that are proximate sorbent particles, as in the design of FIG. 2. In some embodiments, a filter support in the form of a container (e.g., a filter cartridge) may be comprised of e.g.

one or more injection molded housing parts that are assembled together and that may be air-impermeable except for the air inlet(s) and outlet(s). Such housing parts may be conveniently made of e.g. thermoplastic or thermoset polymers or copolymers chosen from e.g. polyamides, polystyrenes, ABS polymers, polyolefins, and so on. Such containers may also include ancillary components such as e.g. one or more resilient gaskets, latches, splash guards, connectors (e.g. as needed for connecting the cartridge to e.g. a personal respiratory protection device) and so on.

It is emphasized that a filter support 10 that is in the form of a container (as in e.g. FIG. 2) does not necessarily have to take the form of a rigid cartridge made e.g. of injection molded parts. Rather, in some embodiments such a container might take the form of e.g. two air-transmissive "walls" at least one of which is made of a relatively flexible material (e.g., a porous substrate such as a fibrous web, a perforated or microperforated flexible polymer film, and so on) with sorbent particles sandwiched between the two walls. Such a container (which may still be referred to in general as a filter "cartridge") might take the form of e.g. a pouch or sachet.

Still further, the term filter support also broadly encompasses any porous, air-permeable material on which or within which sorbent particles 100 are disposed. (By a porous, air-permeable material is meant a material comprising internal porosity that is interconnected so as to allow airflow through the material, as distinguished from e.g. a closed cell foam.) Such materials might be e.g. open-celled foam materials of any suitable type; or, such a material might be a microporous membrane; for example, a phase-inversion membrane, a track-etch membrane (e.g., of the type exemplified by various products available from Whatman under the trade designation NUCLEPORE); or, a stretch-expanded membrane (e.g., of the type exemplified by various products available from W.L Gore and Associates under the trade designation GORE-TEX and available from Celgard corporation under the trade designation CELGARD.) It will be appreciated that filter supports 10 of this general type are not limited to being used e.g. in pairs so as to define a space therebetween as described above. Regardless of the specific mode of use, such a filter support 10 may, in some embodiments, take the form of a sheet-like material that exhibits a major plane and that exhibits a thickness of less than about 8, 5, 3, or 1 mm and that is configured to allow airflow therethrough at least in a direction at least generally perpendicular to the major plane of the sheet-like material.

From the above discussions it will be appreciated that a filter support as disclosed herein widely embraces any material or arrangement, in any form or geometric shape (and whether consisting e.g. of a single entity such as a nonporous substrate, an air-permeable netting, or a porous foam, or made of an assembled combination of parts that collectively form a filter cartridge), that can present sorbent particles to air, e.g. to a stream of moving air. In some embodiments a filter support can be configured so that moving air may flow e.g. at least generally parallel to a major surface of the support that bears sorbent particles (e.g., as in the arrangement of FIG. 1). In some embodiments the moving air may flow at least generally perpendicular to a major surface of the support (e.g., as in the arrangement of FIG. 2). In some embodiments, moving air may flow in directions intermediate between these two extremes. In some embodiments, airflow in both directions and/or in directions intermediate between these two extremes, may occur e.g. in different portions of the air filter.

Figure 3:
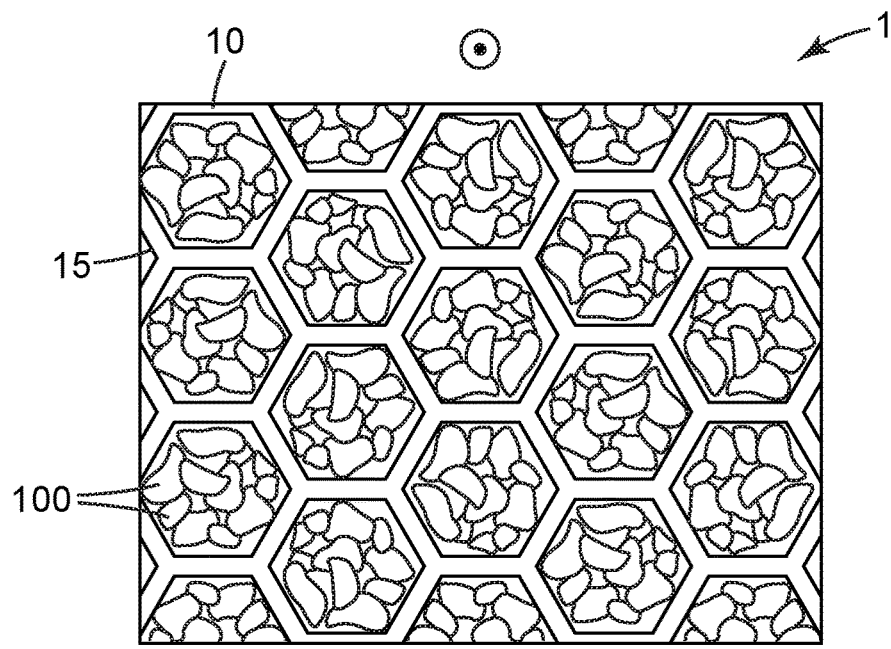
FIG. 3 depicts a portion of another exemplary air filter.

In embodiments of the general type illustrated in exemplary manner in FIG. 3, an air filter 1 may comprise a filter support 10 that is in the form of a "honeycomb" 15. The skilled person will recognize a honeycomb as being a flow-through support structure that comprises numerous macroscopic through-apertures that allow airflow therethrough, the apertures being separated from each other by partitions (walls) of the honeycomb structure. (While the term honeycomb is used here for convenience, the skilled person will appreciate that the structure may be of any geometry (e.g., with apertures that are square, triangular, round, etc.) and may exhibit a somewhat irregular appearance rather than being limited strictly to the regular hexagonal geometry shown in the exemplary design of FIG. 3). Often, such honeycombs may comprise through-apertures with rather large diameter or equivalent diameter (e.g. from 10-15 mm), in contrast to the above-described stacked microstructured substrates, which may often comprise flow-through channels with a diameter or equivalent diameter of only e.g. a few mm or smaller. The walls of the honeycomb may be made of any suitable material, e.g. molded or extruded plastic, paperboard or cardboard, metal, and so on.

In some embodiments, sorbent particles may be attached to interior walls that define the apertures of the honeycomb. However, in some embodiments, it may be convenient to partially, or at least substantially, fill the apertures of the honeycomb with sorbent particles (to the extent permitted by packing behavior, depending e.g. on the average size, size distribution, and shape of the sorbent particles) as in FIG. 3. In such a case the honeycomb may be provided with upstream and downstream air-permeable substrates (e.g., suitable meshes or screens) that allow airflow to enter and exit the through-apertures of the honeycomb and yet retain the sorbent particles within the through-apertures of the honeycomb. (The direction of airflow in the exemplary honeycomb of FIG. 3 is out-of-plane as indicated by the circle/dot arrow.) In some embodiments, the sorbent particles may be packed loosely within the apertures e.g. so that the particles are able to move or shift slightly. In other embodiments, the sorbent particles may be bonded to each other (e.g., by use of an adhesive, a heat-activated binder, etc., in amounts sufficient to bond particles to each other at contact points but not in amounts that would unacceptably occlude the particles so as to impact their ability to capture gaseous substances) e.g. so as to minimize shifting or settling of the particles within the apertures. In other words, in some embodiments (not necessarily limited to use in honeycombs) sorbent particles 100 may be provided in the form of a monolithic, air-permeable block (of any desired size and shape) collectively provided by an aggregation of particles that are bonded together, rather than being provided as individual particles. Exemplary methods of making such monolithic structures (which again, may have any suitable size and shape for incorporation into any desired air filter, for example, for fitting into a container such as e.g. a cartridge or canister, or for forming a layer of e.g. a respirator) are discussed e.g. in U.S. Pat. No. 5,033,465 to Braun. Methods of bonding sorbent particles together to make, in particular, a structure that is at least semi-flexible (and thus may be particularly suited for use in e.g. a flexible respirator mask), are discussed e.g. in U.S. Pat. No. 6,391,429 to Senkus.

The skilled person will appreciate that there may not necessarily be a firm dividing line between some of the above-mentioned embodiments (for example, between sorbent particles being provided within hollow tubes, versus being provided within channels defined by a stacked microstructured substrate, versus being provided within apertures of a honeycomb). All such designs and arrangements, and combinations thereof, are encompassed within the general concept of an air filter that comprises one or more filter supports as disclosed herein. It is noted in particular that in some embodiments, an air filter 1 as disclosed herein can comprise sorbent particles that are partially filled, or at least substantially filled, into the interior of any suitable container (of any geometric form and made of any material, whether e.g. rigid or at least semi-flexible) so as to form e.g. a packed bed. In some embodiments, such a container might take the form of a hollow tube, e.g. a tube resembling the gas-detection tubes often referred to as Drager tubes.

Figure 4:
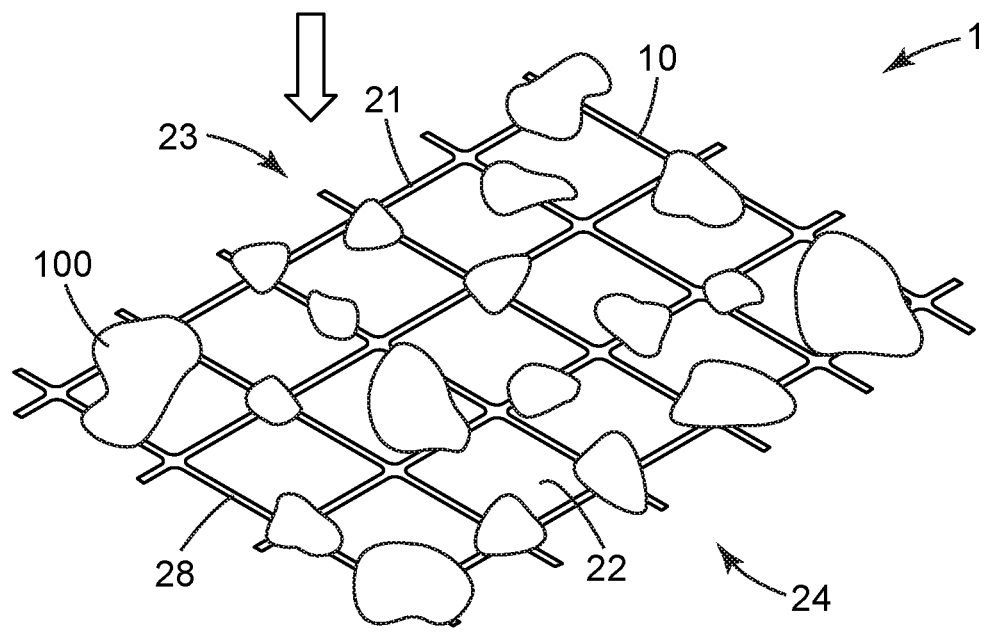
FIG. 4 depicts a portion of another exemplary air filter.

In some embodiments, a filter support 10 may comprise a thin, sheet-like material with numerous through-apertures 22 that allow airflow therethrough, as shown in exemplary, generic representation in FIG. 4. In various embodiments, filter support 10 may take the form of any suitable netting, mesh, screen, scrim, woven or knitted material, meltspun material, microperforated film, and so on. The term netting will be used herein for convenience in describing any such material, that is comprised of relatively few layers (five or less; often, a single layer as in FIG. 4) of filaments (or, in general, layers of solid material in between through-openings). Often, such filaments (or solid portions of a sheet-like filter support material, e.g. a microperforated film) are relatively large (for example, 0.1, 0.2, or 0.5 mm or more) in diameter or the equivalent thereof. Such a netting may be comprised of any suitable material, e.g. an organic polymer, an inorganic material (e.g., glass or ceramic), or a metal or metal alloy.

In such embodiments airflow may occur primarily through the through-apertures 22 between the solid portions 21 (e.g. filaments) of the netting so that the airflow is oriented at least generally perpendicular to the support; however, if desired the airflow could occur at least generally parallel to the netting. In the case of generally perpendicular airflow that passes through the netting, it may be convenient that the sorbent particles are positioned on the upstream side 23 of the netting (as in FIG. 4). However, if desired the sorbent particles may be positioned on the downstream side 24 of the netting. In particular embodiments, sorbent particles may be positioned on both sides of the netting. In some embodiments, a netting (or, in general, any sufficiently air-permeable substrate) comprising sorbent particles may be used "open-face" as in the illustrative embodiments of FIGS. 1 and 4. In other embodiments, a secondary retaining layer that is sufficiently air-permeable (e.g., a second layer of netting, or a layer of a fibrous web, a microporous membrane, or the like) may be positioned atop the sorbent particles to assist in retaining the sorbent particles in position. (In other words, the sorbent particles may be sandwiched between the netting and a secondary retaining layer.)

In many embodiments, sorbent particles 100 may be bonded, e.g. adhesively bonded, to the solid material (e.g., filaments) of the netting, e.g. by way of an adhesive, e.g. a pressure-sensitive adhesive, a hot-melt adhesive, an epoxy adhesive, and the like 28 that is provided on at least one major surface of one side of the netting. Sorbent particles may each be bonded e.g. to a single filament, or may be bonded to multiple filaments. The average diameter of the filaments, and the average size of the through-apertures between the filaments, can be chosen in view of the average size of the sorbent particles if desired. In various embodiments, such nettings may exhibit an average filament diameter in the range of e.g. 0.2 mm to about 2.0 mm. In various embodiments, the openings of the netting may range from e.g. about 0.5 mm in shortest dimension to about 5 mm in longest dimension, and may be chosen in view of the particle size of the sorbent. By way of specific example, a netting with openings in a range of about 1-2 mm may be well suited for use with a sorbent that exhibits a particle size in the range of 8×20 mesh. Exemplary nettings that might be suitable for use as disclosed herein include various products available from Delstar Technologies; for example, the products available under the trade designations KX215P, R0412-10PR, RB0404-10P, N02014-90PP, RB0404-28P, N03011-90PP, and TK16-SBSH.

In particular embodiments, a suitable pressure sensitive adhesive 28 may be provided on a major surface of the netting (in other words, the pressure-sensitive adhesive may be provided on surfaces of the filaments that collectively provide that major surface of the netting). This may be done e.g. by coating a pressure-sensitive adhesive precursor onto the netting and then transforming the precursor into a pressure-sensitive adhesive. The precursor may be e.g. a solution in an organic solvent(s), an emulsion, a hot-melt composition, and so on. Such a precursor may be transformed e.g. by drying to remove solvent and/or water, by cooling to solidify a hot-melt composition, and so on. The deposition and transformation should be done in such manner as to avoid unacceptably filling or clogging the through-apertures of the netting (unless the airflow is not to pass through the netting in ordinary use of the filter).

It will be appreciated that in some embodiments particles that are disposed on a netting may be attached to the netting primarily due to e.g. adhesive bonding (rather than through e.g. mechanical entanglement). In some embodiments, the sorbent particles may be present on a filter support at least substantially in the form of a monolayer. In other embodiments sorbent particles may be present in multiple layers (made e.g. by adhesively bonding a first layer of sorbent particles to a major surface of a netting, applying additional adhesive atop the first layer of sorbent particles, depositing more sorbent particles, and repeating the process to build up a collection of sorbent particles of any desired depth).

Figure 5:
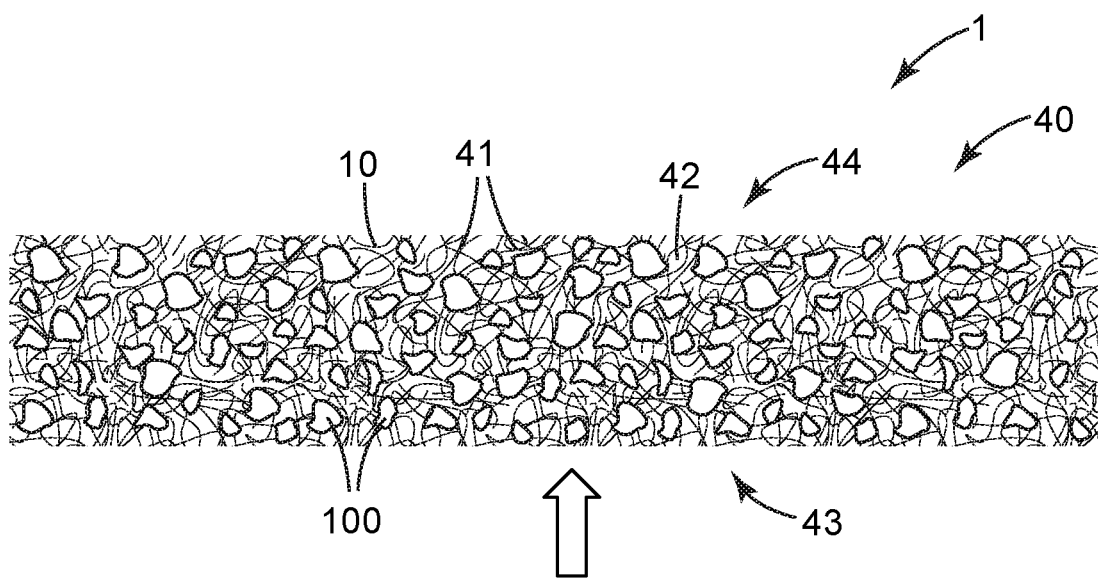
FIG. 5 depicts a portion of another exemplary air filter.

In some embodiments a filter support 10 may comprise a sheet-like material comprised of numerous fibers, often entangled with each other and often present in numerous "layers" (e.g., more than five layers) as shown in exemplary embodiment in FIG. 5. The term fibrous web will be used herein for convenience in describing any such material. It will be appreciated of course that due to the random nature of many such fibrous webs, the fibers may not necessarily be, and often will not be, present in discrete layers (e.g., layers that can be peeled apart from each other); however, it will be readily apparent if e.g. five or more separate fibers or sections of fibers are encountered in traversing the thickness (depth) of such a web from a first major surface 43 thereof to a second major surface 44 thereof (as in FIG. 5). Any material exhibiting such a fiber arrangement falls under the definition of a fibrous web as used herein.

Often, such fibers may be relatively small (for example, less than 100, 80, 60, 40, 20, 10, 5, or 2 µm) in diameter or the equivalent thereof. Mixtures of fibers of various diameters may of course be used. Such a fibrous web may be any suitable type of web, e.g. a nonwoven web in which the fibers are relatively randomly arranged (e.g. except for such partial amounts of fiber alignment as may occur with e.g. carded webs and with certain types of fiber-deposition methods). Alternatively, such a fibrous web may be comprised of a knitted or woven web in which the fibers are provided in a sufficient number of layers. Typically, air will flow through the web by passing through interstitial spaces between the numerous fibers of the web; often, such airflow is oriented at least generally perpendicular to a major plane of the fibrous web as in FIG. 5. However, if desired the airflow could occur at least generally parallel to a major plane of the fibrous web. The fibers of such a fibrous web can be bonded to each other (so that the web has sufficient mechanical integrity to be processed and handled) in any suitable manner. Such bonding methods might be chosen from e.g. hydroentangling, needle-punching, calendering, and the like. In some embodiments, the fibers may be autogenously bonded to each other, meaning that the fibers are bonded at an elevated temperature as obtained in an oven or with a so-called through-air bonder without application of solid contact pressure such as in point-bonding or calendering. In particular embodiments, the fibers may be bonded using autogenous bonding methods of the general type described in U.S. Pat. No. 7,947,142 to Fox (in which a stream of heated air is passed through the collection of fibers followed by forceful quenching). Or, one or more binders (whether in the form of fibers, solid particles, a water-born emulsion, and so on) may be added and then activated (e.g. by heating) to bond the fibers together to form the final web. Any such bonding operation (whether achieved primarily mechanically by entanglement of fibers, or by use of a melt-bonding of fibers and/or by use of an added binder) may additionally serve to bind sorbent particles into or onto the web, as noted below.

In some embodiments sorbent particles may be deposited primarily, or exclusively, on a major surface (e.g., a major upstream surface) of the fibrous web, in somewhat similar manner to the arrangement of particles on the netting of FIG. 4. In some embodiments at least some of the sorbent particles may penetrate at least partly into the interior of the fibrous web. (This is in contrast to the situation with a netting provided by e.g. a monolayer of filaments as in FIG. 4, in which case the support exhibits little or no "interior" into which sorbent particles could penetrate.) In some such embodiments the sorbent particles may be found primarily in the region of the fibrous web proximate the major surface onto or into which the sorbent particles were deposited. In many embodiments, however, it may be desirable to provide that sorbent particles 100 are distributed widely throughout the thickness of the fibrous web (as shown in exemplary embodiment in FIG. 5), as opposed to the particles being e.g. deposited onto one surface so that they either remain on the surface or only penetrate a short distance into the interior of the fibrous web. Suitable methods of forming fibrous webs with sorbent particles distributed widely (e.g., randomly) throughout the interior of the web are discussed later herein.

In particular embodiments, a fibrous web filter support may be a nonwoven web. By definition, nonwoven fibrous webs do not encompass e.g. woven or knitted webs or microperforated films. Such a web can be made by any suitable method and can be of any suitable type. For example, such a nonwoven web might be: a carded web; a wet-laid web (made e.g. by papermaking processes); a dry-laid web made e.g. by a conventional airlaying process such as the well-known Rando-Webber process, or made by a specialized process such as the gravity-laying process described in U.S. Pat. No. 8,834,759 to Lalouch; or, a meltspun web (e.g. a spunbonded web, a spunlaced web, and so on). (It will be appreciated that certain e.g. spunbonded or spunlaced webs may qualify as nettings rather than as fibrous webs, depending e.g. on the depth of fibers that are laid down.) In particular embodiments, the nonwoven web may be a meltblown web, which process and resulting web will be well known to the skilled person. Any combination of layers of these various materials (including combination with layers that are not nonwoven webs) can be used. The fibers may be made of any suitable material, e.g. thermoplastic organic fibers (such as e.g. polyolefin fibers, cellulosic fibers, polyester fibers, nylon fibers, etc.), inorganic fibers (such as e.g. fiberglass or ceramic fibers), metal fibers, and so on.

Sorbent particles may be provided on and/or within a porous material, e.g. a fibrous web such as a nonwoven web to form a herein-disclosed filter support of an air filter, by any suitable method. In some embodiments, the sorbent particles may be deposited on or into a pre-existing fibrous web. For example, in some embodiments a nonwoven web may comprise one or more binding components such as bondable fibers and/or a non-fibrous binder (a non-fibrous binder may take the form of e.g. particles, an emulsion or latex, and so on). The web may be heated to a temperature to soften and activate such a binding component(s), and the sorbent particles may then be deposited onto a major surface of the nonwoven web to be bonded thereto. It will be appreciated that many such processes may preferentially result in sorbent particles being present on or proximate a major surface of the nonwoven web onto which the sorbent particles were deposited. If desired, such a process may be repeated multiple times with the successive layers being bonded together to form a multilayer product comprising sorbent particles therein.

In other embodiments, the sorbent particles may be introduced into a nonwoven web during the process of making the web. For example, if a nonwoven web is made by meltblowing, it may be convenient to introduce the sorbent particles into the flowing stream of incipient fibers (the term incipient fibers refers to molten streams that may or may not have begun to solidify into fibers, or finished solidifying into fibers). General methods of performing such operations are disclosed in US Patent Application Publication No. 20120272829 to Fox, which is incorporated by reference herein. The incipient fibers may be deposited (e.g., onto a temporary collection surface or onto a secondary web that remains as part of the filter support) in a condition in which the incipient fibers are at least slightly sticky (bondable). Such arrangements can provide that at least some of the fibers of the meltblown nonwoven web are bonded (e.g., melt-bonded) to the sorbent particles. In this manner a meltblown web can be made comprising sorbent particles therein, in a single operation.

Of course, it is also possible to use other methods to introduce sorbent particles into a mixture of fibers prior to the fibers being collected as a web. For example, sorbent particles may be mixed with fibers that are input to a web-formation process (e.g., the above-mentioned gravity-laying web-formation process), to form a collected mass of fibers comprising sorbent particles therein. Such an approach can include adding binder (whether in the form of fibers, or as non-fibrous binders such as particles, an emulsion, etc.) to the input materials so that the collected mass of fibers can be heated to bind the fibers together to form a web and/or to bond the sorbent particles into the web. Whatever approaches is/are used, the primary mechanism by which sorbent particles are bound into or onto the fibrous web can be the same or different from the binding mechanism that is used to bind the fibers together to form the web.

With particular regard to a meltblown fibrous web, a variety of fiber-forming polymeric materials may be used to form such fibers. At least some fibers may be made of a material that exhibits sufficient bonding (adhesive) properties under the conditions (e.g., melt-blowing conditions) used in making the nonwoven web. Examples include thermoplastics such as polyurethane elastomeric materials, polybutylene elastomeric materials, polyester elastomeric materials, polyether block copolyamide elastomeric materials, polyolefin-based elastomeric materials (e.g., those available under the trade designation VERSIFY from Dow), and elastomeric styrenic block copolymers (e.g., those available under the trade designations KRATON from Kraton Polymers, Houston, Tex.). Multicomponent fibers (e.g., core-sheath fibers, splittable or side-by-side bicomponent fibers and so-called "islands in the sea" fibers) in which at least one exposed surface of the fibers (e.g., the sheath portion of a core-sheath fiber) exhibits sufficient adhesive properties, may also be used.

In some embodiments, fibers that are able to bond to sorbent particles 100 may be the only fibers present in the meltblown web. In other embodiments, other fibers (e.g. that do not participate to any significant extent in bonding the sorbent particles) may be present e.g. as long as sufficient bondable fibers are present. In various embodiments, bondable fibers may comprise at least about 2 weight percent, at least about 4 weight percent, and at least about 6 weight percent of the meltblown nonwoven web. In further embodiments, bondable fibers may comprise no greater than about 20 weight percent, no greater than about 17 weight percent, and no greater than about 15 weight percent of the meltblown nonwoven web. Any nonbondable fibers that are present in the web may be of any suitable type and composition; for example, any of the well known polyolefinic fibers (e.g. polypropylene, polyethylene, and the like) may be used, as may any of the well known polyester fibers. In at least some embodiments, the nonwoven web is essentially free of any added binder of any kind. That is, in such cases essentially all binding of the sorbent particles (to retain them in the meltblown nonwoven web) is performed by the bondable fibers. Such embodiments thus exclude the presence of binder in such forms as particles or powders, liquids such as latexes, emulsions, suspensions, or solutions, and so on.

It will be appreciated that the above discussions have concerned methods in which bonding of fibers to the sorbent particles is at least partially used to retain the particles within the nonwoven web. Physical entanglement of the sorbent particles within the fibers can also assist in retaining the sorbent particles within the nonwoven web. In some embodiments, a secondary air-permeable layer (e.g. a scrim or facing) can be applied to (e.g., bonded to) one or more major surfaces of the nonwoven web to minimize the chances of any of the sorbent particles becoming dislodged therefrom. In fact, in some embodiments it may be convenient to deposit the incipient fibers that will form a meltblown nonwoven web (along with the sorbent particles that are merged into the stream of incipient fibers), onto a major surface of a secondary web (e.g., scrim or facing) so that the meltblown web is bonded to the secondary web in the act of making the meltblown web.

In some embodiments, air filter 1 may comprise at least one filter media 40. A filter media is a filter support 10 that can retain sorbent particles 100 and expose them to air; beyond this, a filter media is a particular type of filter support that is capable of filtering significant amounts of microscopic particles (i.e., particles of average diameter of 100 microns or less) from moving air. A filter media 40 may comprise any material that can provide an air-permeable network structure into or onto which sorbent particles can be incorporated so as to present the sorbent particles to an airstream that is moving through the air-permeable network structure, and that furthermore is itself capable of filtering microscopic particles. Such a filter media might be e.g. a nonwoven web that is a meltblown and/or charged web.

As noted, a filter media is able to capture a significant amount of microscopic particles (with diameter 100 μm or less). In specific embodiments, a filter media may be able to capture a significant amount of fine particles in the range of e.g. 10 µm or less, or even in the range of 2.5 µm or less. In particular embodiments, the filter media may be capable of performing HEPA filtration. It will be appreciated that use of electret (charged) materials as described below, may substantially enhance the ability to perform e.g. fine-particle filtration or HEPA-filtration. In various embodiments, a filter media 40 may exhibit a Percent Penetration (specified herein as using Dioctyl Phthalate as a challenge material, and tested using methods described in U.S. Pat. No. 7,947,142 to Fox) of less than about 80, 70, 60, 50, 40, 30, 20, 10, or 5. All processes (e.g., fiber-bonding, charging, pleating, and the like), parameters and characterizations that are described herein with respect to filter supports in general, may be applied in particular to filter media.

In some embodiments, a nonwoven web (e.g., a melt-blown nonwoven web) for use as a filter support (or, in particular, as a filter media) may include electrostatically charged fibers. Charging of such fibers may be done by any suitable method, for example, by imparting electric charge to the nonwoven web using water as taught in U.S. Pat. No. 5,496,507 to Angadjivand, or as taught in U.S. Patent Publication No. 2009/0293279 to Sebastian. Nonwoven electret webs may also be produced by corona charging as described in U.S. Pat. No. 4,588,537 to Klaase, or using mechanical approaches to impart an electric charge to fibers as described in U.S. Pat. No. 4,798,850 to Brown. Any combination of such approaches may be used. Fibers may be charged before being formed into the nonwoven web, or after the nonwoven web is formed. (In any case, any such charging may be conveniently performed before the air filter media is pleated, if it is to be pleated.) In the case that an air filter is to include a particle-filtration layer that is a different layer from filter support 10 (as described below), such a particle-filtration layer may be charged if desired, e.g. by any of the above approaches.

If the filter support (whether free-standing, or part of a multilayer assembly) is to be pleated, pleat formation and pleat spacing may be performed using any suitable technique including those disclosed in U.S. Pat. No. 4,798,575 to Siversson, U.S. Pat. No. 4,976,677 to Siversson, and U.S. Pat. No. 5,389,175 to Wenz. Pleating procedures that may be useful are also described e.g. in U.S. Pat. No. 7,235,115 to Duffy. (It will be appreciated, however, that in at least some embodiments the use of score-pleating may be avoided since the scoring process may serve to crush at least some of the sorbent particles.) In various embodiments, the pleated air filter support may include about 0.5 to about 5 pleats per 2.5 centimeters. More specifically, the pleat spacing may be e.g. from about 6, 8, 10, or 12 mm, to about 50, 40, 30, 20, or 15 mm. In various embodiments, the pleat height may be e.g. from about 15, 20, 25, or 30 mm, to about 100, 80, 60 or 40 mm.

An air filter 1 may comprise a filter support 10 (which by definition supports at least some polymeric sorbent particles 100) that consists of a single layer; or, multiple layers of filter support 10 (e.g., each layer including at least some polymeric sorbent particles 100) may be present in an air filter 1. Particularly if the filter support(s) 10 is not itself an air filter media as defined herein, the air filter 1 may include (in addition to the at least one filter support layer 10) one or more particle-filtration layers (e.g., capable of filtration of microscopic particles, fine particles, and/or HEPA filtration) that do not include polymeric sorbent particles 100. Such a particle filtration layer may be electrostatically charged if desired, and in various embodiments may exhibit a Percent Penetration of less than about 80, 70, 60, 50, 40, 30, 20, 10, or 5. (The term particle broadly encompasses e.g. aerosols, dust, mist, fumes, smoke, mold, bacteria, spores, pollen, and so on.) In particular embodiments, such a particle-filtration layer may be a high-loft spunbonded nonwoven web e.g. of the type described in U.S. Pat. No. 8,240,484 to Fox, and comprising a solidity of from less than 8%, to about 4%, and that is comprised of meltspun fibers that are substantially free of crimped fibers, gap-formed fibers and bicomponent fibers.

Regardless of whether or not any particle-filtration layers are present, an air filter 1 may comprise (in addition to at least one filter support layer 10 and any optional particle-filtration layers) one or more secondary layers (e.g., scrims, nettings, covers, and so on), e.g. to serve as a cover layer, a coarse prefilter, a carrier layer, a skin-contacting layer, to provide mechanical support or stiffness, and so on. That is, in general, and without regard to the particular type, configuration or construction of a filter support layer 10, such a filter support layer may be provided as one layer of a multilayer air-permeable assembly (stack) that can collectively provide an air filter 1. Any such multilayer stack may of course be pleated, framed, and so on, as described herein.

The herein-disclosed sorbent particles (whether e.g. dispersed within a nonwoven fibrous web, disposed on a surface of a substrate, filled into a receptacle(s) e.g. to form a packed bed, etc.), may be used in combination with any secondary sorbent particles, configured to capture any desired component present in air (e.g. a noxious gas/vapor). In some embodiments, such secondary sorbent particles may be present in a separate layer that is e.g. upstream or downstream of polymeric sorbent particles 100. In other embodiments, sorbent particles 100 and any desired secondary sorbent particle(s) may be mixed together. Secondary sorbent particles (whether used in a separate layer or as a commingled mixture with polymeric sorbent particles 100) may be chosen from, for example, activated carbon, alumina and other metal oxides, clay, hopcalite, ion exchange resins, molecular sieves and zeolites, silica, sodium bicarbonate, and so on including combinations of any of these materials. In particular embodiments, secondary sorbent particles (e.g. activated carbon) may be impregnated sorbent particles that are suitably impregnated with e.g. any desired metal salt or compound. Various particles (including impregnated particles) that may be suitable for use as secondary sorbent particles are described in detail in U. S. Patent Application Publication No. 2015/0306536 to Billingsley, which is incorporated by reference in its entirety herein for this purpose. Any combination of any of these particles may be used.

In some embodiments, an air filter 1 comprising sorbent particles 100 as disclosed herein, may be used in combination with a secondary air filter that is provided separately from air filter 1. In some embodiments, an air filter 1 and a secondary air filter may be separately installed into different areas of an air-handling apparatus. (For example, an air filter 1 and a secondary air filter may each be a framed air filter and may each be separately inserted e.g. into a room air purifier.) Alternatively, an air filter 1 and a secondary air filter may be assembled together (and e.g. attached to each other) before being installed into e.g. an air-handling apparatus. Air filter 1 can be placed e.g. upstream or downstream of the secondary air filter (if air filter 1 is upstream, it may serve e.g. as a prefilter for the secondary filter). In some exemplary embodiments, a secondary air filter may be configured e.g. to capture fine particles, and may exhibit a Percent Penetration of e.g. less than about 80, 70, 60, 50, 40, 30, 20, 10, or 5.

Figure 6:
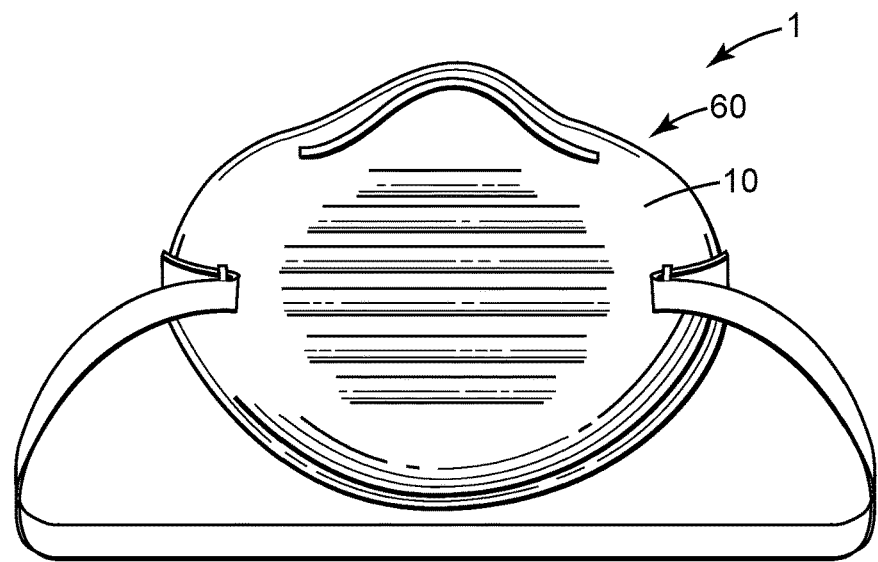
FIG. 6 depicts an exemplary respirator comprising a filter support comprising sorbent particles as disclosed herein.
Figure 7:
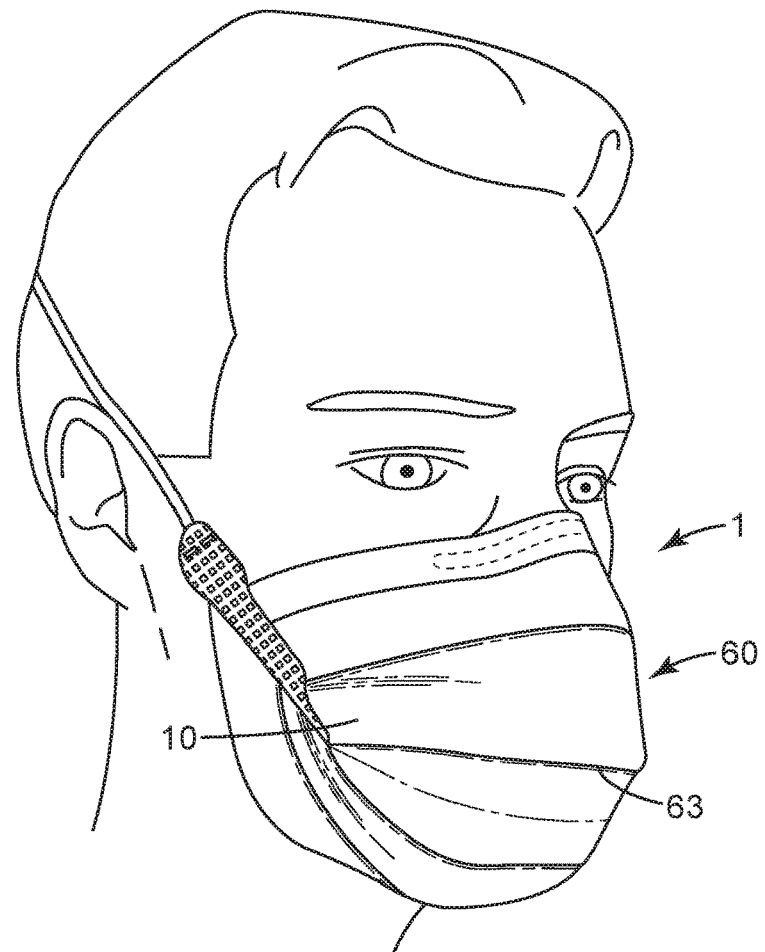
FIG. 7 discloses another exemplary respirator.

A filter support 10 comprising sorbent particles 100 as disclosed herein may be used in any kind of air filter 1, configured for any suitable end use. By way of specific examples, filter support 10 may find use in e.g. an air filter that is, or is part of, a personal respiratory protection device. It has already been noted that filter support 10 may take the form of a filter cartridge that can be fluidly coupled to a mask body to provide a personal respiratory protection device (e.g., the filter cartridge being disposable and the mask body being a piece that is shaped to fit a user's face and that is retained and a replacement filter cartridge attached thereto at an appropriate time). In other embodiments, filter support 10 may be incorporated into a "filtering face-piece" respirator mask 60. In products of this general type, the mask body itself provides the filtering function. That is, unlike respirators that use mask bodies in conjunction with attachable filter cartridges or the like, filtering face-piece respirators are designed to have the filtration layer(s) present over much or essentially all of the entire mask body so that there is no need for installing or replacing a filter cartridge. (That is, in a filtering face-piece respirator the mask body itself performs the filtering function rather than relying on one or more cartridges attached thereto.) Filtering face-piece respirators 60 often come in one of two configurations: molded (e.g. shaped, into a generally cup-shape so as to fit on a user's face) as shown in exemplary representation in FIG. 6, and flat-fold, that can be supplied in a flat or nearly-flat condition and can then be unfolded and expanded to fit on a user's face, as shown in exemplary representation in FIG. 7.

Such a respirator mask (whether e.g. a flat-fold or molded respirator) 60 may comprise any desired ancillary layers (e.g., one or more cover layers, stiffening layers, pre-filter layers, and the like) and components (e.g. one or more exhaust valves, attachment bands or strings, nose-pieces, and so on). If used in a flat-fold respirator mask, filter support 10 may often take the form of a relatively flexible layer (e.g. with one or more preferential folding lines 63 provided to make the material more easily foldable). If filter support 10 is to be used in a molded respirator mask (that is not designed to be foldable), filter support 10 may be e.g. a somewhat semi-rigid material (noting however that since in many molded, cup-shaped respirator masks much of the stiffness may be provided by a stiffening layer that is separate from the filtering layer(s), it may not be strictly necessary that filter support 10 be rigid, or even semi-rigid, for use in such a product).

It will be appreciated that the above-described uses fall primarily into the category of so-called "negative-pressure" respirators; that is, products in which the motive power for moving air is the breathing of a user rather than a separately provided motorized fan. Such negative-pressure respirators are often configured as e.g. full-face respirators, half-face respirators, and hoods (e.g., escape hoods, smoke hoods, and the like). All such products are encompassed by the term negative-pressure respirator as used herein, and filter support 10 may be used with any such product.

In other embodiments, filter support 10 may be used in a respirator in which the motive power for moving air is a motorized fan or blower. Such products may include e.g. a PAPR (powered air purifying respirator). In such products, filter support 10 (and, in general, air filter 1) may be located proximate the user's face or head; or, it may be located remotely (e.g., positioned in a receptacle of a belt-worn housing).

Figure 8:
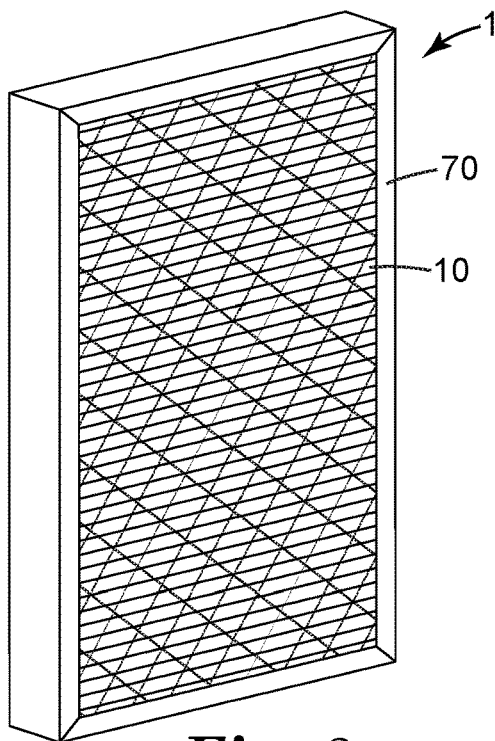
FIG. 8 discloses a framed, pleated air filter comprising a filter support comprising sorbent particles as disclosed herein.

In some embodiments as shown in exemplary embodiment in FIG. 8, a filter support 10 (e.g., whether pleated or not, and whether or not including any other layers such as particle-filtration layers, etc.) may be incorporated into an air filter 1 that includes a perimeter frame 70 (e.g. a rigidifying or supporting frame), which may be e.g. arranged around a perimeter edge region of the filter support. Suitable materials for the frame include chip board, or paperboard, synthetic plastic materials and metal. Suitable frame constructions might be chosen from e.g. the "pinch" frame construction illustrated in FIGS. 1-4 of U.S. Pat. No. 6,126,707 to Pitzen, the "box" frame construction illustrated in FIGS. 5 and 6 of the '707 patent, the hybrid frame construction illustrated in FIGS. 7-11 of the '707 patent, any of the frame constructions disclosed in U.S. Pat. No. 7,503,953 to Sundet, and any of the frame constructions disclosed in U.S. Pat. No. 7,235,115 to Duffy. Any such frame may be attached to the filter support by any suitable method, e.g. hot-melt bonding, room-temperate glue, and so on.

An air filter 1 (whether framed or not) comprising filter support 10 may be advantageously used to filter moving air in any suitable powered air-handling system, e.g. in HVAC systems (e.g., in forced-air heating, cooling, and/or heating/cooling systems often used in residences, office buildings, retail establishments, and so on). Such filters may also find use in room air purifiers, motor vehicles (such as in e.g. cabin air filtration of automobiles), clean rooms, operating rooms, and the like. In some embodiments, air filter 1 (e.g., as part of a filter cartridge) may be inserted into an air pathway of a powered air-purifying respirator, as noted above. While in any or all such uses it may not be necessary that air filter 1 be a framed air filter, in many such uses it may be advantageous for air filter 1 to be a framed air filter.

The above discussions relate to methods of providing polymeric sorbent particles 100 on a suitable filter support 10 to provide an air filter 1 and positioning the air filter so that the supported sorbent particles are exposed to air (the term air is used broadly and encompasses any gas or gaseous mixture, e.g. nitrogen, dehumidified nitrogen or air, oxygen-enriched air, air including an anesthetic gas or gas mixture, and so on). In many embodiments, the air to which the sorbent particles are exposed is in the form of a moving airstream. In some cases (which may be referred to as "active" filtration) such moving air may be motivated by a motorized blower, fan, and so on. In other cases (which may be referred to as "passive" filtration) such moving air may be motivated e.g. by the breathing of a person rather than by any motorized mechanism. The term "passive" filtration also encompasses situations in which an air filter 1 is exposed to currents, eddies, and the like, e.g. in an ambient atmosphere. Such currents and eddies might take the form of e.g. wind (such as might be impinged against an exterior surface of a filter support 10 that is provided in the form of e.g. a window screen). Or, in indoor environments, such currents and eddies might take the form of convection currents, random air currents, and the like, which regularly occur e.g. in rooms of buildings (due e.g. to doors opening and closing, persons moving, and so on). It will thus be appreciated that an air filter 1 as disclosed herein encompasses such devices as e.g. a cartridge, bag, pouch, canister, or, in general, any kind of container that holds sorbent particles 100 therein and that has at least one air-permeable wall so as to allow air to enter the container and contact the sorbent particles and to then exit the container, regardless of whether such a device is or is not used with any kind of mechanical blower or is used in any kind of respirator.

In broad summary, air filters 1 as described herein can find use in any suitable application in which it is desired to remove at least some aldehyde molecules from air. Such uses may involve personal devices (e.g. personal respiratory protection devices) designed for use by a single user, or collective devices (e.g. room air purifiers, HVAC systems, and so on) designed for e.g. buildings, vehicles, and other places whether persons reside, work, or gather. As noted, such uses may involve "active" or "passive" filtration, and may use an air filter 1 that is configured in any of a wide variety of geometric formats and that is comprised of any of a wide variety of materials. Also as noted, one or more secondary sorbents may be used in addition to the herein-described polymeric sorbent particles 100, whether mixed with particles 100 and/or provided in a separate layer. As further noted, an air filter 1 may include at least one layer (in addition to the at least one support layer 10 that supports polymeric sorbent particles 100) that provides fine-particle filtration and/or that captures some gas/vapor other than aldehydes. Instead of this, or as an adjunct to this, a secondary air filter may be provided in addition to air filter 1, e.g. to perform filtration of fine particles and/or to capture some other gas/vapor. Moreover, combinations of any of the above-described embodiments of filter supports may be used. For example, polymeric sorbent particles 100 might be disposed within a fibrous web, or onto a surface of a netting, which web or netting might e.g. be placed within a housing to provide a filter cartridge.

The polymeric sorbent particles 100 are a reaction product of a divinylbenzene/maleic anhydride precursor polymeric material with a nitrogen-containing compound. The nitrogen-containing compound becomes covalently attached to the polymeric material. The polymeric sorbent typically is provided in the form of particles that are porous, with the pores often being in the size range of mesopores and/or micropores. The polymeric sorbent can be used to sorb aldehydes that are volatile at room temperature or under use conditions. Suitable aldehydes are typically of Formula (I)

R₂—(CO)—H     (I)

where $R_2$ is hydrogen, alkyl, vinyl, or aryl. The molecular weight of the aldehyde of Formula (I) is typically no greater than 200 grams/mole. In some embodiments, the aldehyde is formaldehyde ($R_2$ is hydrogen) or acetaldehyde ($R_2$ is methyl).

As noted, the polymeric sorbent is obtained by the reaction of a divinylbenzene/maleic anhydride precursor polymeric material with a nitrogen-containing compound. The precursor polymeric material is synthesized from a polymerizable composition that includes a monomer mixture containing maleic anhydride, divinylbenzene, and an optional styrene-type monomer. More specifically, the precursor polymeric material is formed from a monomer mixture containing 1) 8 to 65 weight percent maleic anhydride, 2) 30 to 85 weight percent divinylbenzene, and 3) 0 to 40 weight percent of a styrene-type monomer, wherein the styrene-type monomer is styrene, an alkyl substituted styrene, or a combination thereof. The amounts are based on the total weight of monomers in the monomer mixture, which is equal to the total weight of monomers in the polymerizable composition. When the precursor polymeric material is used to form a polymeric sorbent that is particularly effective for sorption of aldehydes, the monomer mixture often contains 1) 15 to 65 weight percent maleic anhydride, 2) 30 to 85 weight percent divinylbenzene, and 3) 0 to 40 weight percent of a styrene-type monomer, wherein the styrene-type monomer is styrene, an alkyl substituted styrene, or a combination thereof.

The maleic anhydride that is included in the monomer mixture results in the formation of maleic anhydride monomeric units of Formula (II) within the precursor polymeric material.

The asterisks in this formula and other formulas contained herein denote the location of attachment of the monomeric unit to another monomeric unit or to a terminal group.

The amount of maleic anhydride used to form the precursor polymeric material influences the amount of nitrogen-containing compound that can react with the precursor polymeric material to form the polymeric sorbent. The nitrogen-containing compound reacts with the anhydride group to become covalently attached to the polymeric material that is the polymeric sorbent.

In some embodiments, the amount of maleic anhydride included in the monomer mixture is at least 8 weight percent, at least 10 weight percent, at least 12 weight percent, at least 15 weight percent, or at least 20 weight percent. The amount of maleic anhydride can be up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent. For example, the maleic anhydride may be present in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (II) in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. These amounts are based on the total weight of the monomeric units in the precursor polymeric material.

The divinylbenzene included in the monomer mixture results in the formation of divinylbenzene monomeric units of Formula (III) within the precursor polymeric material.

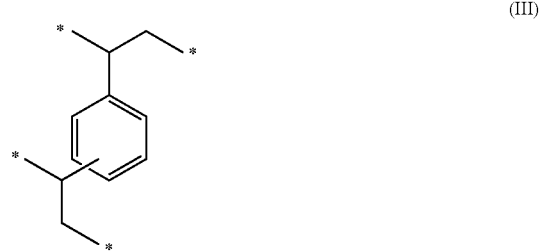

The two groups attached to the benzene ring can be in an ortho, meta, or para arrangement to each other. The monomeric units of Formula (III) contribute to the high crosslink density and to the formation of a rigid polymeric material having micropores and/or mesopores.

The amount of divinylbenzene used to form the precursor polymeric material can have a strong influence on the BET specific surface area of both the precursor polymeric material and the polymeric sorbent. The BET specific surface area tends to increase with an increase in the amount of divinylbenzene in the monomer mixture used to form the precursor polymeric material and with the resulting amount of monomeric units of Formula (III) in the polymeric sorbent. If the amount of divinylbenzene is less than 30 weight percent, the polymeric sorbent may not have a sufficiently high BET specific surface area. On the other hand, if the amount of divinylbenzene is greater than 85 weight percent, the amount of aldehyde sorbed may be compromised because there are fewer nitrogen-containing groups in the polymeric sorbent. In some embodiments, the amount of divinylbenzene included in the monomer mixture is at least 30 weight percent, at least 35 weight percent, at least 40 weight percent, or at least 45 weight percent. The amount of divinylbenzene can be up to 85 weight percent, up to 80 weight percent, up to 75 weight percent, up to 70 weight percent, up to 65 weight percent, up to 60 weight percent, or up to 50 weight percent. For example, the amount can be in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (III) in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. These amounts are based on the total weight of the monomeric units in the precursor polymeric material.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl substituted styrene (e.g., ethyl styrene), or mixtures thereof. Thus, styrene-type monomers are often present along with divinylbenzene and maleic anhydride in the monomer mixture contained in the polymerizable composition used to form the precursor polymeric material. The monomer mixture typically contains 0 to 40 weight percent styrene-type monomers based on the total weight of monomers in the monomer mixture. If the content of the styrene-type monomer is greater than 40 weight percent, the crosslink density may be too low and/or the distance between crosslinks may be too large to provide a polymeric sorbent with the desired BET specific surface area (e.g., at least 25 m²/grams). As the crosslink density decreases, the polymeric sorbent tends to be less rigid and less porous. Typically, divinylbenzene having a purity of 55 weight percent is not suitable for use in the monomer mixtures used to form the precursor polymeric material because the content of styrene-type monomer impurities is too high. That is, to provide a monomer mixture having a minimum amount of divinylbenzene, the divinylbenzene often is at least about 80 weight percent pure. Using divinylbenzene having a lower purity than about 80 weight percent can result in the formation of a precursor polymeric material and/or a polymeric sorbent with an undesirably low BET specific surface area.

The styrene-type monomers included in the monomer mixture result in the presence of styrene-type monomeric units of Formula (IV) within the precursor polymeric material.

(IV)

Group R₃ is hydrogen or alkyl (e.g., an alkyl having 1 to 10 carbon atoms, 1 to 6 carbon atoms or 1 to 4 carbon atoms).

In some embodiments, the amount of styrene-type monomers used to form the precursor polymeric material, is at least 1 weight percent, at least 2 weight percent, or at least 5 weight percent. The amount of styrene-type monomers can be up to 40 weight percent, up to 30 weight percent, up to 20 weight percent, or up to 10 weight percent. For example, the amount can be in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. The amounts are based on the total weight of monomers in the monomer mixture contained in the polymerizable composition used to form the precursor polymeric material.

Stated differently, the precursor polymeric material contains monomeric units of Formula (IV) in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. These amounts are based on the total weight of the monomeric units in the precursor polymeric material.

Overall, the precursor polymeric material is formed from a polymerizable composition containing a monomer mixture that includes 8 to 65 weight percent maleic anhydride, 30 to 85 weight percent divinylbenzene, and 0 to 40 weight percent of a styrene-type monomer. In some embodiments, the monomer mixture contains 15 to 65 weight percent maleic anhydride, 30 to 85 weight percent divinylbenzene, and 0 to 40 weight percent (or 5 to 40 weight percent) of a styrene-type monomer. Some embodiments contain 25 to 65 weight percent maleic anhydride, 30 to 75 weight percent divinylbenzene, and 1 to 20 weight percent (or 5 to 20 weight percent) styrene-type monomer. Some embodiments contain 25 to 60 weight percent maleic anhydride, 30 to 75 weight percent divinylbenzene, and 1 to 30 weight percent (or 5 to 30 weight percent or 10 to 30 weight percent)

styrene-type monomer. In still other embodiments, the monomer mixture contains 30 to 65 weight percent maleic anhydride, 30 to 70 weight percent divinylbenzene, and 1 to 20 weight percent (or 5 to 20 weight percent or 10 to 20 weight percent) styrene-type monomer. In still other embodiments, the monomer mixture contains 30 to 60 weight percent maleic anhydride, 30 to 65 weight percent divinylbenzene, and 1 to 20 weight percent (or 5 to 20 weight percent or 10 to 20 weight percent) styrene-type monomer. In further embodiments, the monomer mixture contains 40 to 60 weight percent maleic anhydride, 30 to 55 weight percent divinylbenzene, and 1 to 20 weight percent (or 5 to 20 weight percent, or 10 to 20 weight percent) styrene-type monomers. In still further embodiments, the monomer mixture contains 20 to 40 weight percent maleic anhydride, 50 to 70 weight percent divinylbenzene, and 1 to 20 weight percent (or 5 to 20 weight percent or 10 to 20 weight percent) styrene-type monomer. The weight percent values are based on the total weight of monomers in the monomer mixture used to form the precursor polymeric material.

The monomer mixture included in the polymerizable composition used to form the precursor polymeric material typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, at least 99.9 weight percent, or 100 weight percent of the monomers in the monomer mixture are selected from maleic anhydride, divinylbenzene, and styrene-type monomer. In some embodiments, where high purity divinylbenzene is used, the monomer mixture contains only divinylbenzene and maleic anhydride. That is, the sum of the amount of divinylbenzene and maleic anhydride is 100 weight percent.

In addition to the monomer mixture, the polymerizable composition used to form the precursor polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the precursor polymeric material as it begins to form. The organic solvent typically includes a ketone, ester, acetonitrile, or mixture thereof.

The organic solvent can function as a porogen during the formation of the precursor polymeric material. The organic solvent choice can strongly influence the BET specific surface area and the size of the pores formed in the precursor polymeric material. Using organic solvents that are miscible with both the monomers and the forming polymer tends to result in the formation of micropores and mesopores within the precursor polymeric material. Good solvents for the monomers and the forming polymer tend to result in a larger fraction of the porosity of the final polymeric sorbent being in the form of micropores and mesopores.

Organic solvents that are particularly suitable include ketones, esters, acetonitrile, and mixtures thereof. Provided that the resulting precursor polymeric material has a BET specific surface area equal to at least 100 $m^2$/gram, other organic solvents can be added along with one or more of these organic solvents. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 75 weight percent (i.e., the polymerizable composition contains 25 to 99 weight percent organic solvent). If the percent solids are too low, the polymerization time may become undesirably long. The percent solids are often at least 1 weight percent, at least 2 weight percent, at least 5 weight percent, at least 10 weight percent, or at least 15 weight percent. If the weight percent solids is too great, however, the monomers do not form a single phase with the organic solvent. Further, increasing the percent solids tends to result in the formation of precursor polymeric material with a lower BET specific surface area. The percent solids can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 70 weight percent, 5 to 60 weight percent, 5 to 50 weight percent, 5 to 40 weight percent, 5 to 30 weight percent, or 5 to 25 weight percent.

In addition to the monomer mixture and organic solvent, the polymerizable compositions used to form the precursor polymeric material typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on the total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a precursor polymeric material.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a precursor polymeric material can be prepared that has a BET specific surface area equal to at least 100 m²/gram. The BET specific surface area of the precursor polymeric material can be at least 150 m²/gram, at least 200 m²/gram, or at least 300 m²/gram. The BET specific surface area can be, for example, up to 1000 m²/gram or higher, up to 900 m²/gram, up to 800 m²/gram, up to 750 m²/gram, or up to 700 m²/gram.

The precursor polymeric material is the reaction product of the polymerizable composition. The precursor polymeric material formed from the polymerizable composition contains (a) 8 to 65 weight percent of a first monomeric unit of Formula (II),

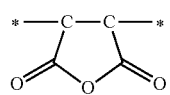
(II)

(b) 30 to 85 weight percent of a second monomeric unit of Formula (III), and

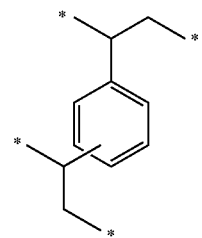
(III)

(c) 0 to 40 weight percent of a third monomeric unit of Formula (IV) wherein $R_3$ is hydrogen or alkyl (e.g., an alkyl having 1 to 10 carbon atoms, 1 to 6 carbon atoms, or 1 to 4 carbon atoms).

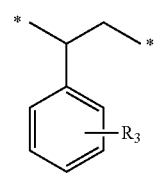
(IV)

In many embodiments, to be particularly effective as a polymeric sorbent for aldehydes, the precursor polymeric material contains (a) 15 to 65 weight percent of a first monomeric unit of Formula (II), (b) 30 to 85 weight percent of a second monomeric unit of Formula (III), and (c) 0 to 40 weight percent (or 5 to 40 weight percent) of a third monomeric unit of Formula (IV). Each weight percent value is based on the total weight of monomeric units in the precursor polymeric material.

Some embodiments of the precursor polymeric material contain 25 to 65 weight percent of the first monomeric unit of Formula (II), 30 to 75 weight percent of the second monomeric unit of Formula (III), and 1 to 20 weight percent (or 5 to 20 weight percent) of the fourth monomeric unit of Formula (IV). Some embodiments contain 25 to 60 weight percent of the first monomeric unit of Formula (II), 30 to 75 weight percent of the second monomeric unit of Formula (III), and 1 to 30 weight percent (or 5 to 30 weight percent or 10 to 30 weight percent) of the fourth monomeric unit of Formula (IV). In still other embodiments, the monomer mixture contains 30 to 65 weight percent of the first monomeric unit of Formula (II), 30 to 70 weight percent of the second monomeric unit of Formula (III), and 1 to 20 weight percent (or 5 to 20 weight percent or 10 to 20 weight percent) of the fourth monomeric unit of Formula (IV). In still other embodiments, the monomer mixture contains 30 to 60 weight percent of the first monomeric unit of Formula (II), 30 to 65 weight percent of the second monomeric unit of Formula (III), and 1 to 20 weight percent (or 5 to 20 weight percent or 10 to 20 weight percent) of the fourth monomeric unit of Formula (IV). In further embodiments, the monomer mixture contains 40 to 60 weight percent of the first monomeric unit of Formula (II), 30 to 55 weight percent of the second monomeric unit of Formula (III), and 1 to 20 weight percent (or 5 to 20 weight percent, or 10 to 20 weight percent) of the fourth monomeric unit of Formula (IV). In still further embodiments, the monomer mixture contains 20 to 40 weight percent of the first monomeric unit of Formula (II), 50 to 70 weight percent of the second monomeric unit of Formula (III), and 1 to 20 weight percent (or 5 to 20 weight percent or 10 to 20 weight percent) of the fourth monomeric unit of Formula (IV). The weight percent values are based on the total weight of monomeric units used in the precursor polymeric material.

The polymeric sorbent is formed by reacting the precursor polymeric material with a nitrogen-containing compound. The nitrogen-containing compound, which is usually basic, reacts with the anhydride group in the precursor polymeric material. That is, the nitrogen-containing compound reacts with the monomeric units of Formula (II) within the precursor polymeric material. This reaction results in the formation of a covalent bond linking the nitrogen-containing compound to the polymeric material.

The nitrogen-containing compound is ammonia, a compound having a single primary amino group (—$NH_2$), or a compound having two or more groups of formula —NHR where R is hydrogen or alkyl. Suitable alkyl R groups (i.e., an alkyl is a monovalent radical of an alkane) often have 1 to 20 carbon atoms. For example, the alkyl can have at least 1 carbon atom, at least 2 carbon atoms, or at least 4 carbon atoms and can have up to 20 carbon atoms, up to 18 carbon atoms, up to 16 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

The nitrogen-containing compounds having a single primary amino group is a primary amine compound and typically does not include other primary and/or secondary amino groups. That is, there is a single nitrogen-containing group and it is —$NH_2$. The nitrogen-containing compound having at least two amino groups of formula —NHR can have two or more primary amino groups (where R is equal to hydrogen), can have two or more secondary amino groups (where R is equal to an alkyl), or can have at least one primary amino group plus at least one secondary amino group.

Many suitable nitrogen-containing compounds are of Formula (V).

$$R_4NHR_1 \quad (V)$$

In Formula (V), the group $R_1$ is hydrogen or an alkyl. The group $R_4$ is hydrogen, alkyl, or a group of formula —$R_5$—$NHR_6$, or —(C=NH)—$NH_2$. The group $R_5$ is a covalent bond, an alkylene, an arylene, an aralkylene, a heteroalkylene having one or more oxy (—O—) groups, or a heteroalkylene having one or more —NH— groups. The group $R_6$ is hydrogen, alkyl, or —(C=NH)—$NH_2$.

Formula (V) is equal to ammonia when both $R_1$ and $R_4$ are hydrogen. Formula (V) is equal to a compound having a single primary amino group when $R_1$ is hydrogen and $R_4$ is alkyl. Formula (V) is equal to a compound having two or more groups of formula —NHR when $R_4$ is —$R_5$—$NHR_6$ or when $R_4$ is —(C=NH)—$NH_2$.

Suitable alkyl groups for $R_1$ in Formula (V) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

In some embodiments, $R_4$ in Formula (V) is an alkyl. To be suitable as a nitrogen-containing compound, $R_1$ is equal to hydrogen when $R_4$ is an alkyl. That is, the compound of Formula (V) is a primary amine compound. Suitable alkyl groups for $R_4$ often have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. Examples of suitable primary amine compounds include, but are not limited to, methylamine, ethylamine, propylamine, butylamine, and cyclohexylamine.

In some embodiments, $R_4$ in Formula (V) is a group of formula —$R_5$—$NHR_6$ and the nitrogen-containing compound is of Formula (V-1).

$$R_6HN—R_5—NHR_1 \quad (V\text{-}1)$$

Such compounds have at least two amino groups of formula —NHR. Suitable alkyl groups for $R_6$ in Formula (V-1) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The group $R_5$ can be a covalent bond (i.e., the nitrogen containing compound is a hydrazine compound) or an alkylene (i.e., an alkylene is a divalent radical of an alkane), an arylene, an aralkylene, a heteroalkylene having one or more oxy (—O—) groups, or a heteroalkylene having one or more —NH— groups.

Suitable alkylene $R_5$ groups in Formula (V-1) usually have at least 1 carbon atom, at least 2 carbon atoms, at least 3 carbon atoms, or at least 4 carbon atoms and can have up to 20 carbon atoms, up to 16 carbon atoms, up to 12 carbon atoms, up to 10 carbon atoms, or up to 6 carbon atoms. Some nitrogen-containing compounds are of Formula (V-1) with $R_1$ being hydrogen and $R_5$ being an alkylene, and $R_6$ being hydrogen. Examples of such nitrogen-containing compounds are alkylene diamines such as, for example, methylene diamine, ethylene diamine, propylene diamine, and butylene diamine. Nitrogen-containing compounds of Formula (V-1) having both $R_1$ and $R_6$ equal to alkyl include N,N'-dimethylethylene diamine.

In other embodiments of the compounds of Formula (V-1), the group $R_5$ is a heteroalkylene (i.e., a heteroalkylene is a divalent radical of a heteroalkane, which is an alkane having catenary heteroatoms) having at least one catenary —O— or —NH— group. Stated differently, heteroalkylene $R_3$ groups have one or more groups of formula —$R_a$—[O—$R_b$]$_n$— or —$R_a$—[NH—$R_b$]$_n$— where each $R_a$ and each $R_b$ are independently an alkylene and n is an integer in a range 1 to 50, 1 to 40, 1 to 30, 1 to 20, 1 to 10, 1 to 6, or 1 to 4. Suitable $R_a$ and $R_b$ alkylene groups often have 1 to 10 carbon atoms, 1 to 6 carbon atoms, 1 to 4 carbon atoms, or 1 to 3 carbon atoms. The heteroalkylene often has up to 30 carbon atoms and up to 16 heteroatoms, up to 20 carbon atoms and up to 11 heteroatoms, or up to 10 carbon atoms and up to 6 heteroatoms. Such nitrogen-containing compounds can be represented by Formulas (V-2) and (V-3).

$$R_6HN—R_a—[O—R_b]_n—NHR_1 \quad (V\text{-}2)$$

$$R_6HN—R_a—[NH—R_b]_n—NHR_1 \quad (V\text{-}3)$$

Some nitrogen-containing compounds are of Formula (V-2) with $R_1$ being hydrogen, $R_5$ being a heteroalkylene with —O— groups, and $R_6$ being hydrogen. Examples of such nitrogen-containing compounds are poly(alkylene oxide) diamines such as polyethylene glycol diamine and polypropylene glycol diamine. Further nitrogen-containing compounds are of Formula (V-3) with $R_1$ being hydrogen, $R_5$ being a heteroalkylene with —NH— groups, and $R_6$ being hydrogen. Such nitrogen-containing compounds can be, for example, compounds of formula $H_2N—[(CH_2)_xNH]_y—(CH_2)_xNH_2$ where x is an integer in a range of 1 to 4 and y is in a range of 1 to 10. Examples include diethylene triamine, triethylene tetramine, and tetraethylene pentamine.

The $R_5$ group in Formula (V-1) can also be an arylene or aralkylene group. Suitable arylene (i.e., divalent radical of a carbocylic aromatic compound) $R_5$ groups typically have 6 to 12 carbons and are often phenylene or diphenylene. Suitable aralkylene $R_5$ groups refer to divalent groups that have an alkylene substituted by an aryl group, an arylene substituted with an alkyl group, or an arylene bonded to an alkylene group. The alkylene or alkyl portion of the aralkylene often has 1 to 10 carbon atoms, 1 to 6 carbon atoms, or 1 to 4 carbon atom. The aryl or arylene portion of the aralkylene often has 6 to 12 carbon atoms and is often either phenyl or phenylene. Example nitrogen-containing compounds of Formula (V-1) with both $R_1$ and $R_6$ being hydrogen and $R_5$ being arylene include, but are not limited to, phenylene diamine.

Yet other nitrogen-containing compounds are of Formula (V-1) with $R_6$ being —(C=NH)—$NH_2$ as shown in Formula (V-4).

$$NH_2—(C=NH)—HN—R_5—NHR_1 \quad (V-4)$$

For example, in some compounds, $R_1$ is hydrogen and $R_5$ is alkylene. One such compound is agmatine. Agmatine can be represented by other resonance structures as well but is considered to be within the scope of both Formula (V-1) and (V-4).

In other embodiments of Formula (V), $R_4$ is a group —(C=NH)—$NH_2$. The resulting compounds are of Formula (V-5).

$$H_2N—(C=NH)—NHR_1 \quad (V-5)$$

This compound is guanidine when $R_1$ is hydrogen.

Other suitable nitrogen-containing compounds are polyamines having at least three groups of formula —$NHR^1$ where $R^1$ is hydrogen or alkyl. Such compounds can be of Formula (VI).

$$R_7—(NHR_1)_z \quad (VI)$$

In Formula (V), $R_1$ is defined as above and the variable z is equal to at least 3 and can be up to 10, up to 8, up to 6, or up to 4. The $R_7$ group is often a z-valent radical of an alkane or a z-valent radical of a heteroalkane. Suitable z-valent radicals of alkanes often have a branching carbon atom with at least three of the four adjacent groups being —$CH_2$—. Suitable z-valent radicals of heteroalkanes often have a branching nitrogen atom with three adjacent carbon atoms (e.g., three adjacent groups that are alkylene or alkyl groups) or a branching carbon atom with at least three of the four adjacent atoms being carbon (e.g., three adjacent groups that are alkylene or alkyl groups). These z-valent radicals of heteroalkanes often include one or more groups of formula —$R_c$—[NH—$R_d]_p$—where each $R_c$ and each $R_d$ are independently an alkylene and p is an integer in a range 1 to 50, 1 to 40, 1 to 30, 1 to 20, 1 to 10, 1 to 6, or 1 to 4. Suitable $R_c$ and $R_d$ alkylene groups often have 1 to 10 carbon atoms, 1 to 6 carbon atoms, 1 to 4 carbon atoms, or 1 to 3 carbon atoms. The z-valent radicals of alkanes often have at least 2 carbon atoms, at least 3 carbon atoms, at least 4 carbon atoms, or at least 5 carbon atoms and up to 20 carbon atoms, up to 16 carbon atoms, up to 12 carbon atoms, or up to 8 carbon atoms. The z-valent radicals of heteroalkanes often have up to 30 carbon atoms and up to 16 heteroatoms, up to 20 carbon atoms and up to 11 heteroatoms, or up to 10 carbon atoms and up to 6 heteroatoms.

Specific polyamines of formula $R_7—(NHR_1)_z$ include various polyimines. Some polyimines include one or more branching nitrogen atoms with each nitrogen-branching atom connected to three groups of formula —$R_c$—[NH—$R_d]_p$—. The end group of each branched segment is often a group of formula —$NHR_1$ such as —$NH_2$. Examples include various branched polyethyleneimines. Another specific polyamine is 2-(aminomethyl)-2-methyl-1,3-propanediamine where $R_7$ is a trivalent radical of an alkane (i.e., the carbon branching atom is connected to four carbon atoms with three adjacent alkylene groups and one adjacent methyl group), each $R_1$ is hydrogen, and z is equal to 3.

In many embodiments, the nitrogen-containing compounds such as those of Formula (V) (including Formula V-1 to V-5) and Formula (VI) have a molecular weight (or weight average molecular weight) that is no greater than 2000 Daltons (Da). For example, the molecular weight (or weight average molecular weight) is no greater than 1500 Da, no greater than 1000 Da, no greater than 750 Da, no greater than 500 Da, or no greater than 250 Da.

The nitrogen-containing compound reacts with the monomeric units of Formula (II) in the precursor polymeric material. This reaction results in the covalent bonding of the nitrogen-containing compound to the polymeric material with the reaction sites being the anhydride group (—(CO)—O—(CO)—) in the monomeric unit of Formula (II). The ring structure is typically opened forming monomeric units of Formula (VII), Formula (VIII), or a mixture thereof.

(VII)

(VIII)

In Formula (VII) and (VIII), group A is equal to —$NR_1R_4$ if a nitrogen-containing compound of Formula (V) is used and is equal to —$NR_1$—$R_7(NHR_1)_{z-1}$ if a nitrogen-containing compound of Formula (VI) is used. Alternatively, a ring structure could possibly form such as shown in Formula (IX) where $A_1$ is a divalent group and is equal to the compound of Formula (V) or to the compound of Formula (VI) minus two hydrogen atoms.

(IX)

Up to two moles of nitrogen-containing compound could be added for every mole of monomeric units of Formula (II) in the precursor polymeric material. That is, up to 200 mole percent nitrogen-containing compound can react with the precursor polymeric material based on the total moles of monomeric units of Formula (II). In some embodiments, the amount of nitrogen-containing compound added is up to 175 mole percent, up to 150 mole percent, up to 125 mole percent, or up to 100 mole percent based on the total moles of monomeric units of Formula (II) in the precursor polymeric material. The amount of the nitrogen-containing compound can be at least 1 mole percent, at least 2 mole percent, at least 5 mole percent, at least 10 mole percent, at least 20 mole percent, at least 50 mole percent, at least 75 mole percent, or at least 100 mole percent based on the total moles of monomeric units of Formula (II) in the precursor polymeric material. In some embodiments, the amount of nitrogen-containing compound is in a range of 1 to 200 mole percent, in a range of 10 to 200 mole percent, in a range of 50 to 200 mole percent, in a range of 50 to 150 mole percent, a range of 75 to 150 mole percent, in a range of 75 to 125 mole percent, or in a range of 100 to 200 mole percent based on the total moles of monomeric units of Formula (II) in the precursor polymeric material.

To react the nitrogen-containing compound with the precursor polymeric material, the nitrogen-containing compound is often dissolved in water and/or a suitable organic solvent. Suitable organic solvents are those that dissolve but do not react with the nitrogen-containing compound. Exemplary organic solvents include, but are not limited to, alcohols, ethers such as tetrahydrofuran and diethyl ether, and various chlorinated solvents such as methylene chloride and chloroform. The concentration of the nitrogen-containing compound in water and/or organic solvent can be any suitable amount depending on the solubility of the nitrogen-containing compound. In some embodiments, the concentration of the nitrogen-containing compound in water and/or organic solvent is in a range of 1 to 40 weight percent, in a range of 1 to 30 weight percent, in a range of 1 to 20 weight percent, or in a range of 1 to 10 weight percent.

The solution of the nitrogen-containing compound is mixed with the precursor polymeric material. The reaction between the nitrogen-containing compounds can occur at room temperature or can occur by heating the mixture to a temperature above room temperature. For example, the mixture can be heated at temperatures in a range of 30 to 120° C. for several hours to several days. In some embodiments, the suspension is heated at 30 to 100° C., 40 to 90° C., 50 to 90° C., or 60 to 80° C. for 12 to 24 hours.

The particle size of sorbent particles for use with a filter support (of any type) may vary as desired. In various embodiments, the sorbent particles may have a standard U.S. mesh size (grade) of at least about 4 mesh (i.e., particle size nominally less than 4.8 mm), 6 mesh (particle size nominally less than 3.4 mm), 8 mesh (particle size less than about 2.4 mm), 12 mesh (less than 1680 micrometers), at least about 16 mesh (<1190 micrometers), at least about 20 mesh (<840 micrometers), at least about 40 mesh (<425 micrometers), or at least about 60 mesh (<250 micrometers). In further embodiments, the sorbent particles may have a standard U.S. mesh grade of no greater than about 325 mesh, (i.e., particle size nominally greater than 44 micrometers); 230 mesh (>63 micrometers), 140 mesh (>105 micrometers), 100 mesh (>150 micrometers), 80 mesh (>180 micrometers), 60 mesh (>250 micrometers), 50 mesh (>300 micrometers), or 45 mesh (>355 micrometers).

The skilled person will understand that all of these mesh sizes correspond to nominal grades rather than absolute standards; for example, if a material is described as a 12 mesh material, then approximately 95% or more of the particles will pass through a 12-mesh sieve (and will thus be nominally smaller than about 1680 micrometers in size). If a material is described as 12×20 mesh, then 95% or more of the material will pass through a 12-mesh sieve (i.e. particles smaller than about 1680 micrometers will pass through a 12-mesh sieve) and be retained by a 20-mesh sieve (i.e. particles larger than about 841 micrometers will not pass through a 20-mesh sieve). Mixtures (e.g., bimodal mixtures) of sorbent particles having different size ranges may be employed if desired. Sorbent particles 100 may be processed so as to have any desired particle size distribution. Such processing may include e.g. sieving the particles and/or mechanically grinding the particles as desired.

The porosity of a polymeric sorbent can be characterized from an adsorption isotherm of an inert gas such as nitrogen or argon by the porous material under cryogenic conditions (e.g., liquid nitrogen at 77° K). The adsorption isotherm is typically obtained by measuring adsorption of the inert gas such as argon by the porous polymeric sorbent at multiple relative pressures in a range of about $10^{-6}$ to about 0.98+ 0.01. The isotherms are then analyzed using various methods such as the BET (Brunauer-Emmett-Teller) method to calculate specific surface area and such as Density Functional Theory (DFT) to characterize the porosity and the pore size distribution.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen at 77° K) over a range of relative pressures. The term "BET specific surface area" is the surface area per gram of a material (typically, $m^2$/gram) that is usually calculated from adsorption isotherm data of the inert gas over a relative pressure range of 0.05 to 0.30 using the BET method.

The polymeric sorbent typically has a BET specific surface area that is less than that of the precursor polymeric material. The opening of the anhydride group to form the monomeric units of Formula (VII) and (VIII) may sufficiently increase the conformational freedom in the backbone resulting in decreased porosity. In addition, hydrogen bonding between the nitrogen-containing groups in the monomeric units of Formula (VII), (VIII), and (IX) could possibly restrict or block access to pores. Because of this decrease, it is often desirable to prepare a precursor polymeric material having the highest possible BET specific surface area yet having sufficient anhydride groups to react with the nitrogen-containing compound.

The polymeric sorbent typically has a BET specific surface area equal to at least 25 $m^2$/gram. In some embodiments, the BET specific surface area is at least 50 $m^2$/gram, at least 75 $m^2$/gram, or at least 100 $m^2$/gram. The BET specific surface area can be up to 700 $m^2$/gram or higher, up to 600 $m^2$/gram, up to 500 $m^2$/gram, up to 400 $m^2$/gram, up to 300 $m^2$/gram, or up to 200 $m^2$/gram. In some embodiments, the BET specific surface area is in a range of 25 to 600 $m^2$/gram, in a range of 25 to 500 $m^2$/gram, in a range of 25 to 400 $m^2$/gram, in a range of 25 to 300 $m^2$/gram, in a range of 50 to 300 $m^2$/gram, in a range of 50 to 200 $m^2$/gram, in a range of 75 to 200 $m^2$/gram, or in a range of 50 to 100 $m^2$/gram.

The BET specific surface area is at least partially attributable to the presence of micropores and/or mesopores in the polymeric sorbent. Argon adsorption isotherms (at 77° K) of the polymeric sorbent indicate that there is considerable adsorption of argon at relative pressures below 0.1, which suggests that micropores are present. There is a gradual increase in adsorption at relative pressures between 0.1 and about 0.95. This increase is indicative of a wide size distribution of mesopores.

In some embodiments, at least 20 percent of the BET specific surface area of the polymeric sorbent is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The porous polymeric sorbent has a total pore volume equal to at least 0.05 cm$^3$/gram. Total pore volume is calculated from the amount of argon adsorbed at liquid nitrogen temperature (77° K) at a relative pressure)(p/p° equal to approximately 0.98 (e.g., 0.98±0.01). In some embodiments, the total pore volume is at least 0.075 cm$^3$/gram, at least 0.10 cm$^3$/gram, at least 0.15 cm$^3$/gram, at least 0.20 cm$^3$/gram, at least 0.25 cm$^3$/gram, or at least 0.30 cm$^3$/gram. The total pore volume can be up to 1.0 cm$^3$/gram or even higher, up to 0.9 cm$^3$/gram, up to 0.8 cm$^3$/gram, up to 0.7 cm$^3$/gram, up to 0.6 cm$^3$/gram, or up to 0.5 cm$^3$/gram, up to 0.4 cm$^3$/gram, up to 0.3 cm$^3$/gram, or up to 0.2 cm$^3$/gram. The pore volume is often in a range of 0.05 to 1 cm$^3$/gram, in a range of 0.05 to 0.8 cm$^3$/gram, in a range of 0.05 to 0.6 cm$^3$/gram, in a range of 0.05 to 0.4 cm$^3$/gram, in a range of 0.05 to 0.2 cm$^3$/gram, or in a range of 0.75 to 0.2 cm$^3$/gram.

The structure of the divinylbenzene/maleic anhydride polymeric material is particularly well suited for use as a precursor polymeric material for the porous polymeric sorbent. Providing that the content of monomeric units of Formula (IV) from styrene-type monomers are low, the divinylbenzene/maleic anhydride precursor polymeric material has alternating monomeric units from divinylbenzene and maleic anhydride. This structure results in high cross-linking and contributes to the formation of a porous polymeric material, particularly a porous polymeric material having a high content of micropores and/or mesopores.

In some embodiments, the polymeric sorbent further includes an acid-base indicator. The acid-base colorimetric indicator (i.e., a dye (typically an organic dye) that changes color when it undergoes a transition from being in an acidic form to being in a basic form) can be added at the same time as the nitrogen-containing compound or can be added after addition of the nitrogen-containing compound. The acid-base colorimetric indicator is typically selected to have a pK$_b$ that is less than a pK$_b$ of the nitrogen-containing compound. That is, the acid-base colorimetric indicator is selected to change from a first color to a second color when all or a significant portion of the available nitrogen-containing groups on the polymeric sorbent have reacted with an aldehyde. The change in color signals that the capacity of the polymeric sorbent for sorption of an aldehyde has been reached or is close to being reached. As used herein, the term "close to being reached" means that at least 60 percent or more of the capacity has been reached (i.e., a least 60 percent or more of the available sorption sites have been used for sorption of an aldehyde). For example, at least 70 percent, at least 80 percent, at least 90 percent, or at least 95 percent of the sorption sites have been used for sorption of an aldehyde.

Knowing the pK$_b$ of the nitrogen-containing compound, one of skill in the art can readily select an acid-base colorimetric indicator that has a lower pK$_b$ value. In some applications, the difference between the pK$_b$ value of the nitrogen-containing compound and the pK$_b$ of the acid-base colorimetric indicator is at least 1, at least 2, at least 3, or at least 4. The pK$_b$ of the acid-base colorimetric indicator is often in a range of 3 to 10.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein.

The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 5 to 10 milligrams per milliliter. Often, about 0.5 grams of the polymeric sorbent is soaked in about 10 milliliters of the solution.

The polymeric sorbents offer a distinct advantage over sorbents based on impregnation of a capture agent. The capture agents are typically simply sorbed on the matrix material such as, for example, activated carbon. That is, the capture agents are usually not covalently attached to the matrix material and can migrate. In contrast, the polymeric sorbents described herein have covalently attached nitrogen-containing groups that interact with the aldehyde and that do not migrate.

In some embodiments in which an acid-base indicator is present, the role of polymeric sorbent particles 100 may be at least partly, or primarily, to provide a visual indication that a gaseous aldehyde (e.g. formaldehyde) is present in the air to which the polymeric sorbent particles are exposed. That is, a collection of such polymeric sorbent particles 100, presented on a suitable filter support 10, might provide a similar function as, for example, the well-known gas detection devices of the type exemplified by Drager tubes.

In another aspect, a method of sorbing an aldehyde by polymeric sorbent particles 100 as supported on filter support 10 of an air filter 1 is provided. The polymeric sorbent is in the form of particles and is a reaction product of (a) a precursor polymeric material and (b) a nitrogen-containing compound. As noted above, the sorbent may be e.g. ground and/or sieved to any suitable particle size distribution. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound that is selected from ammonia, a compound having a single primary amino group (—NH$_2$), or a compound having at least two amino groups of formula —NHR where R is hydrogen or alkyl. Suitable nitrogen-containing compounds are typically of Formula (V) and (VI) as described above.

The porous polymeric sorbent sorbs aldehydes. Suitable aldehydes are of Formula (I).

$$R_2\text{—(CO)—H} \qquad \text{(I)}$$

where R$_2$ is hydrogen, alkyl, vinyl, aryl, or aryl substituted with an alkyl. Suitable alkyl groups typically have 1 to 10 carbon atoms, 1 to 6 carbon atoms, 1 to 4 carbon atoms, 1 to 3 carbon atoms, or 1 carbon atom. The aryl group can have up to 12 carbon atoms or up to 6 carbon atoms. The aryl group is often phenyl. The aryl group can be substituted with an alkyl group such as an alkyl group having 1 to 4 carbon atoms or 1 to 3 carbon atoms.

The aldehyde is sorbed by the polymeric sorbent when it is in the form of a gas or vapor. Thus, the molecular weight of the aldehyde is typically no greater than 200 grams/mole, no greater than 150 grams/mole, no greater than 100 grams/mole, no greater than 75 grams/mole, or no greater than 50 grams/mole. Suitable aldehydes include, but are not limited to formaldehyde, acetaldehyde, propionaldehyde, butyraldehyde, pentanal (valeraldehyde), isovaleraldehyde, hexanal, benzaldehyde, 2,5-dimethylbenzaldehyde, 2,4-dimethylbenzaldehyde, 2,3-dimethylbenzaldehyde, tolualdehydes (ortho-tolualdehyde, meta-tolualdehyde, para-tolualdehyde, and mixtures thereof), acrolein and crotonaldehyde.

The aldehyde can be sorbed at room temperature or at any desired temperature such as in a range of −30° C. to 150° C., −30° C. to 100° C., or in a range of −20° C. to 50° C.

In another aspect, a composition is provided that includes the porous polymeric sorbent particles as supported on a filter support, and an aldehyde sorbed on the porous polymeric sorbent. The polymeric sorbent and the aldehyde are the same as described above. The aldehyde can react with any primary amino or secondary amino group present on the polymeric sorbent. In some embodiments, the polymeric sorbent is formed using a compound of any of Formulas (V), (V-1), (V-4), (V-5), or (VI), as the nitrogen containing compound.

List of Exemplary Embodiments

Embodiment 1 is an air filter comprising a filter support that supports polymeric sorbent particles, wherein the polymeric sorbent comprises a reaction product of: (a) a precursor polymeric material comprising a polymerized product of a polymerizable composition comprising (1) 8 to 65 weight percent maleic anhydride based on the total weight of monomers in the polymerizable composition; (2) 30 to 85 weight percent divinylbenzene based on the total weight of monomers in the polymerizable composition; and (3) 0 to 40 weight percent of a styrene-type monomer based on the total weight of monomers in the polymerizable composition, wherein the styrene-type monomer is styrene, an alkyl-substituted styrene, or a combination thereof; and (b) a nitrogen-containing compound that is selected from ammonia, a compound having a single primary amino group (—NH2), or a compound having at least two amino groups of formula —NHR where R is hydrogen or alkyl, and wherein the polymeric sorbent is present in the form of porous particles.

Embodiment 2 is the air filter of embodiment 1 wherein the filter support comprises a substrate with at least one major surface with at least some polymeric sorbent particles disposed thereon. Embodiment 3 is the air filter of embodiment 2 wherein the polymeric sorbent particles are present substantially as a monolayer on the major surface of the substrate. Embodiment 4 is the air filter of embodiment 1 wherein the filter support comprises a porous, air-permeable material with polymeric sorbent particles disposed on a major surface thereof and/or with polymeric sorbent particles disposed within the interior of the material at least in a location proximate the major surface of the material. Embodiment 5 is the air filter of embodiment 4 wherein polymeric sorbent particles are disposed throughout the interior of the porous, air-permeable material.

Embodiment 6 is the air filter of any of embodiments 1-5 wherein the air filter consists essentially of the filter support.

Embodiment 7 is the air filter of any of embodiments 1-6 wherein the filter support comprises a sheet-like material that exhibits a major plane and that exhibits a thickness of less than about 3 mm and that is configured to allow airflow through the filter support at least in a direction at least generally perpendicular to the major plane of the sheet-like material. Embodiment 8 is the air filter of any of embodiments 1-3 and 6-7 wherein the filter support comprises a netting with a major surface with at least some polymeric sorbent particles adhesively attached thereto.

Embodiment 9 is the air filter of any of embodiments 1-7 wherein the filter support comprises a fibrous web that exhibits an interior and wherein the polymeric sorbent particles are disposed within at least portions of the interior of the web. Embodiment 10 is the air filter of embodiment 9 wherein the polymeric sorbent particles are disposed throughout an interior of the fibrous web. Embodiment 11 is the air filter of any of embodiments 9-10 wherein the web is a nonwoven fibrous web. Embodiment 12 is the air filter of embodiment 11 wherein the nonwoven fibrous web is a meltblown web. Embodiment 13 is the air filter of any of embodiments 9-12 wherein at least some fibers of the fibrous web are each bonded to at least one polymeric sorbent particle.

Embodiment 14 is the air filter of any of embodiments 1-13 wherein the filter support is one layer of a multilayer, air-permeable assembly. Embodiment 15 is the air filter of embodiment 14 wherein the multilayer air-permeable assembly includes at least one layer that is not the same layer as the filter support and that is a particle-filtration layer exhibiting a Percent Penetration of less than 50. Embodiment 16 is the air filter of embodiment 15 wherein the particle-filtration layer comprises electret moieties.

Embodiment 17 is the air filter of any of embodiments 1-16 wherein the filter support is a filter media that exhibits a Percent Penetration of less than 50.

Embodiment 18 is the air filter of any of embodiments 1-17 wherein the filter support is pleated.

Embodiment 19 is the air filter of any of embodiments 1-18 wherein the air filter is a framed air filter that is configured to be inserted into an air filter receptacle of an air-handling apparatus chosen from the group consisting of a forced air heating unit, a forced air cooling unit, a forced-air heating/cooling unit, a room air purifier, and a cabin air filtration unit for a motor vehicle.

Embodiment 20 is the air filter of any of embodiments 1, 6, and 14-16 wherein the filter support comprises a honeycomb with through-apertures within which sorbent particles are disposed.

Embodiment 21 is the air filter of any of embodiments 1-5 and 7-18 wherein the filter support provides a layer of a filtering face-piece respirator. Embodiment 22 is the air filter of embodiment 21 wherein the filtering face-piece respirator is chosen from the group consisting of flat-fold respirators and molded respirators.

Embodiment 23 is the air filter of any of embodiments 4-18 wherein the filter support comprises a container with an interior within which polymeric sorbent particles are disposed, and with at least one air inlet and at least one air outlet. Embodiment 24 is the air filter of embodiment 23 wherein the filter support comprises a filter cartridge. Embodiment 25 is the air filter of embodiment 24 wherein the filter cartridge is configured to be used with a personal protection device chosen from the group consisting of half-face negative-pressure respirators, full-face negative-pressure respirators, escape hoods, and powered air-purifying respirators.

Embodiment 26 is a method of capturing at least some of an aldehyde from air, the method comprising: positioning an air filter comprising a filter support comprising polymeric sorbent particles of any of embodiments 1-25, so that the polymeric sorbent particles are exposed to the air, and, sorbing at least some of the aldehyde that is present in the air, onto the polymeric sorbent particles, wherein the aldehyde is of Formula (I): R2-(CO)—H wherein R2 is hydrogen, alkyl, vinyl, or aryl and wherein the molecular weight of the aldehyde of Formula (I) is no greater than 200 grams/mole. Embodiment 27 is the method of embodiment 26, wherein $R_2$ is hydrogen or methyl.

Embodiment 28 is the method of any of embodiments 26-27, wherein the filter support exhibits a major surface and wherein the air is present in the form of an airstream moving in a direction that is at least generally aligned with a plane of the major surface of the filter support. Embodiment 29 is the method of any of embodiments 26-27, wherein the filter support allows airflow therethrough and wherein the air is present in the form of an airstream that passes through at least a portion the filter support in a direction at least generally perpendicular to a major surface of the filter support.

Embodiment 30 is the method of any of embodiments 26-27, performed using the air filter of any of embodiments 1-25.

Embodiment 31 is a method of making an air filter comprising a filter support that comprises polymer sorbent particles, the method comprising: (a) providing a precursor polymeric material comprising a polymerized product of a polymerizable composition comprising (1) 8 to 65 weight percent maleic anhydride based on the total weight of monomers in the polymerizable composition; (2) 30 to 85 weight percent divinylbenzene based on the total weight of monomers in the polymerizable composition; and (3) 0 to 40 weight percent of a styrene-type monomer based on the total weight of monomers in the polymerizable composition, wherein the styrene-type monomer is styrene, an alkyl-substituted styrene, or a combination thereof; and (b) reacting the precursor polymeric material with a nitrogen-containing compound that is selected from ammonia, a compound having a single primary amino group (—NH2), or a compound having at least two amino groups of formula —NHR where R is hydrogen or alkyl, to form the polymeric sorbent, wherein the polymeric sorbent has a covalently attached nitrogen-containing group and is in the form of particles; and, (c) supporting the polymeric sorbent particles on a filter support.

Embodiment 32 is the air filter of any of embodiments 1-25, wherein the air filter further comprises at least one secondary sorbent. Embodiment 33 is the air filter of embodiment 32, wherein the at least one secondary sorbent comprised activated carbon.

Embodiment 34 is the air filter of any of embodiments 1-25 and 32-33, wherein the polymerizable composition comprises 15 to 65 weight percent maleic anhydride, 30 to 85 weight percent divinylbenzene, and 0 to 40 weight percent of a styrene-type monomer. Embodiment 35 is the air filter of any of embodiments 1-25 and 32-33, wherein the polymerizable composition comprises 25 to 65 weight percent maleic anhydride, 30 to 75 weight percent divinylbenzene, and 1 to 20 weight percent styrene-type monomer. Embodiment 36 is the air filter of any of embodiments 1-25 and 32-33, wherein the polymerizable composition comprises 30 to 65 weight percent maleic anhydride, 30 to 70 weight percent divinylbenzene, and 1 to 20 weight percent styrene-type monomer.

Embodiment 37 is the air filter of any of embodiments 1-25 and 32-36, wherein the nitrogen-containing compound is of Formula (V): $R_4NHR_1$ wherein $R_1$ is hydrogen or an alkyl; $R_4$ is hydrogen, alkyl, a group of formula —$R_5$—$NHR_6$, or —(C=NH)—$NH_2$; $R_5$ is a covalent bond, an alkylene, an arylene, an aralkylene, a heteroalkylene having one or more oxy (—O—) groups, or a heteroalkylene having one or more —NH— groups; and $R_6$ is hydrogen, alkyl, or —(C=NH)—$NH_2$. Embodiment 38 is the air filter of embodiment 37, wherein the nitrogen-containing compound of Formula (V) has a molecular weight no greater than 2000 Daltons.

Embodiment 39 is the air filter of any of embodiments 1-25 and 32-36, wherein the nitrogen-containing compound is of Formula (VI): $R_7$—$(NHR_1)_z$ wherein $R_7$ is a z-valent radical of an alkane or a z-valent radical of a heteroalkane; and z is an integer in a range of 3 to 10.

Embodiment 40 is the air filter of any of embodiments 1-25 and 32-39, the polymeric sorbent further comprising an acid-base dye.

EXAMPLES

Analysis and Characterization Procedures

Porosity and gas sorption experiments were performed in similar manner to the procedures described in U.S. Provisional Patent Application No. 62/269,613 to Wendland, entitled Polymeric Sorbents for Aldehydes, which is incorporated by reference in its entirety herein.

Working Example A

A batch of precursor polymeric material was made in generally similar manner as described in Example 14 of U.S. Provisional Patent Application No. 62/269,613 to Wendland. The precursor polymeric material had a BET specific surface area ($SA_{BET}$) in the range of approximately 320 m$^2$/gram and a total pore volume in the range of approximately of 0.250 cm$^3$/gram (measured at a partial pressure)(p/p°) equal to 0.98).

The polymeric precursor material was sieved to 8×12 mesh. In a 32 ounce jar, 164 mL (2.45 moles) of ethylenediamine (EDA) was dissolved in 492 mL of ethanol (EtOH). To this solution was added 100 grams of the polymeric precursor material. The jar was capped and placed on a roller. The jar was rolled at room temperature for 18 hours. The solid was isolated by vacuum filtration and washed with EtOH. The solid was placed in a 32 ounce jar, and 500 mL of EtOH was added to the jar. The solid was allowed to stand in the EtOH for 4 hours. The solid was again isolated by vacuum filtration and washed with EtOH. The solid was then dried in a batch oven at 120° C. for 3 hours. This product (polymeric sorbent) had a BET specific surface area ($SA_{BET}$) in the range of approximately 140 m$^2$/gram and a total pore volume in the range of approximately 0.17 cm$^3$/gram (p/p° equal to 0.98).

An air filter (sold for use with room air purifiers designated as model KJEA-400, available from 3M Company, Shanghai, China) was obtained. The filter as obtained comprised a honeycomb support filled with a sorbent that was believed to be an activated carbon and that appeared to be in the form of particles in the range of 6×12 mesh. A protective screen was removed from one major side of the honeycomb and the activated carbon was discarded (from each of the through-apertures of the honeycomb) and was replaced by a roughly equivalent volume of the above-described polymeric sorbent. (However, the total weight of polymeric sorbent used was only about 40 percent of the weight of the activated carbon that it replaced, due to the significantly lower density of the polymeric sorbent.) The protective screen was replaced to provide the Working Example A air filter.

A similar honeycomb-based air filter was obtained (with the as-supplied activated carbon left therein) and was used as a Comparative Example.

Figure 9:
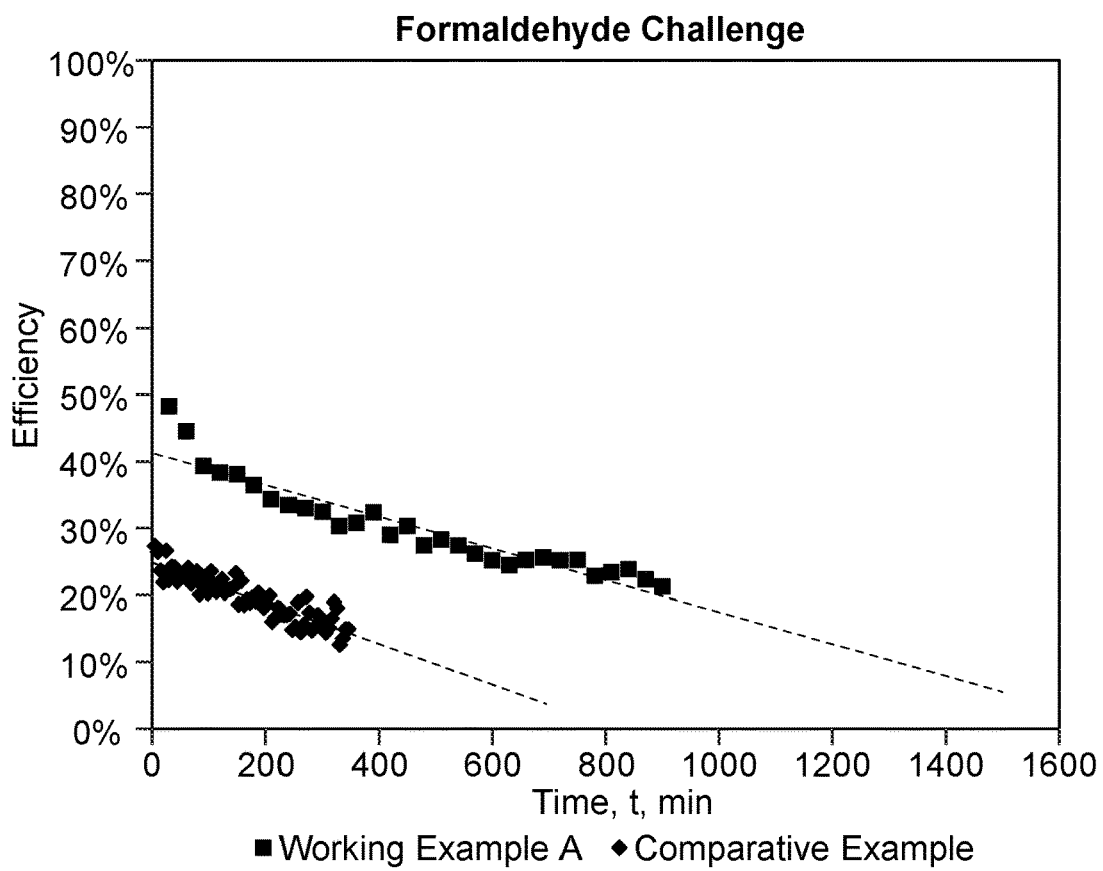
FIG. 9 presents formaldehyde capture efficiency data for a Working Example and a Comparative Example.
Figure 10:
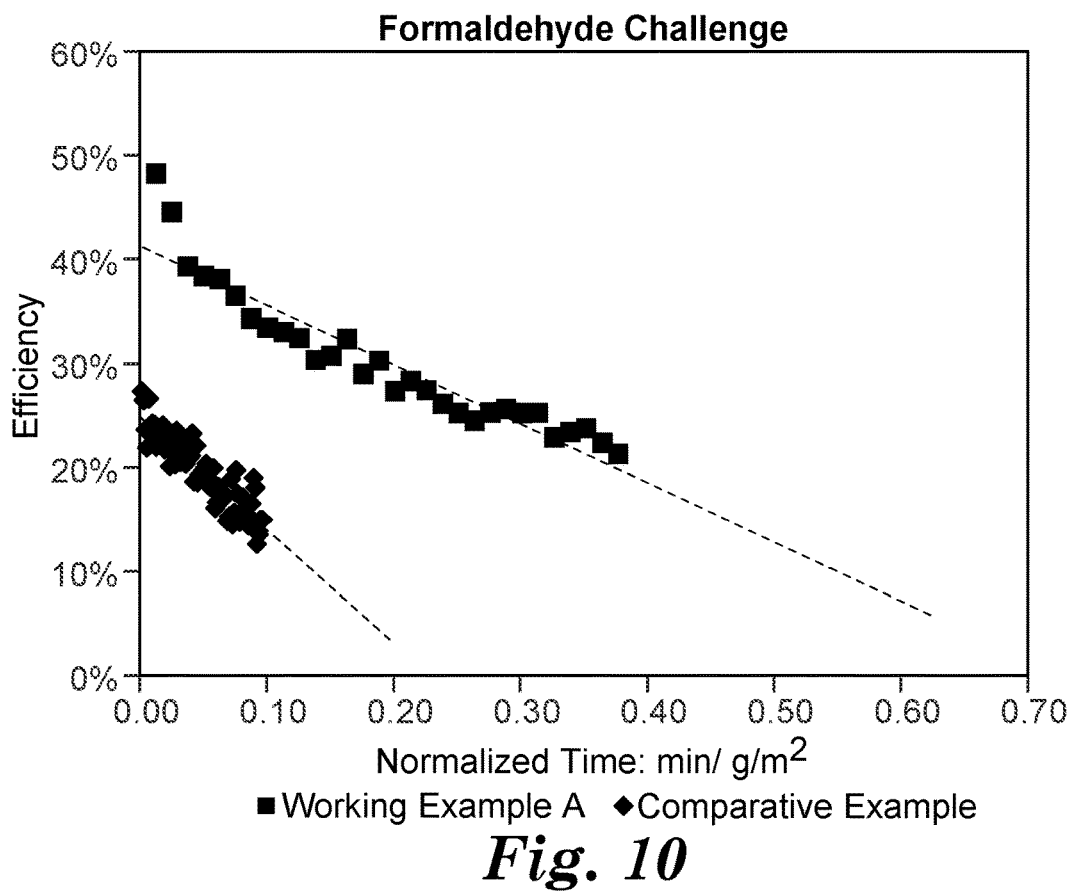
FIG. 10 presents formaldehyde capture efficiency data for the Working Example of FIG. 9, with the x-axis normalized by the mass per unit area of sorbent.

A formaldehyde capture efficiency test was performed on the two filter samples against a challenge of 9 parts per million (by volume) formaldehyde at 50% relative humidity and a 156 LPM air flow. Formaldehyde was generated by heating a paraformaldehyde solution in a 50% humid air stream. The formaldehyde concentration was measured using a photoacoustic detector from California Analytical Instruments. A formaldehyde capture efficiency was calculated by % Efficiency=100*(1−$C_{downstream}$ (filter in use)/$C_{downstream}$ (filter not in use)) where C is the concentration of formaldehyde in the flowing airstream. FIG. 9 presents (for each air filter/sorbent sample) a plot of formaldehyde capture efficiency as a function of time; FIG. 10 presents the data of FIG. 9 with the time (x) axis normalized by the mass per unit area (grams per square meter) at which each sorbent was used.

From the formaldehyde capture efficiency plots, a total formaldehyde loading capacity at 95% formaldehyde breakthrough was obtained. This was performed (using the normalized data) by fitting a line to the plot using standard fitting methods, and extrapolating the line to the x-axis point when the formaldehyde capture efficiency had dropped to 5%. The area under the line was then calculated and was multiplied by the mass flow rate of the formaldehyde, and the sorbent mass per unit area, to obtain the Formaldehyde Capacity (reported in grams of formaldehyde sorbed per square meter of filter area).

TABLE A

| Item | Units | Comparative Example | Working Example A |
| --- | --- | --- | --- |
| Test Area | m² | 0.0053 | 0.0053 |
| Formaldehyde Capacity | g/m² | 30.1 | 108 |
| Sorbent Weight | g/m² | 5600 | 2300 |
| Sorbent Capacity | Mass % | 0.54% | 4.7% |
| Initial Efficiency | % | 27 | 53 |

In Table A, the Test Area is the total area of the apertures of the honeycomb that were exposed to moving airflow (the same for both filter samples). Formaldehyde Capacity is the formaldehyde loading capacity at 95% formaldehyde breakthrough, obtained from the above-described procedure. The Sorbent Weight is the loading of sorbent per unit area of the filter sample. The Sorbent Capacity is the Formaldehyde Capacity divided by the Sorbent Weight, so that the Sorbent Capacity is reported (in percent) as mass formaldehyde captured per mass of sorbent used. The Initial Efficiency is obtained by extending the formaldehyde capture efficiency plot (of FIG. 10) to an x-axis value of zero, to provide an estimate of the efficiency of the sorbent in capturing formaldehyde upon initial exposure of the sorbent to formaldehyde.

Working Example B

A batch of precursor polymeric material was made in generally similar manner as described above for Working Example A. The procedure was repeated a total of six times to amass 1256 grams of 20×60 mesh sieved polymeric precursor material. In a 5 gallon plastic vessel, 2056 mL (30.8 moles) of EDA was dissolved in 8225 mL of EtOH. To this solution was added 1256 grams of the polymeric precursor material. The vessel was capped and placed on a roller. The vessel was rolled at room temperature for 18 hours. The solid was isolated by vacuum filtration and washed with EtOH. The solid was placed in a 5 gallon plastic vessel, and 8.0 L of EtOH was added to the vessel. The solid was allowed to stand in the EtOH for four hours. The solid was again isolated by vacuum filtration and washed with EtOH. The solid was then dried in a batch oven at 120° C. for 3 hours. This product (polymeric sorbent) had a BET specific surface area ($SA_{BET}$) in the range of approximately 140 m²/gram and a total pore volume in the range of approximately 0.17 cm³/gram (p/p° equal to 0.98).

A three-layer stack comprising a middle layer that was a filter support comprising polymeric sorbent particles was formed in a process similar to that described in U.S. Patent Application Publication No. 2012272829 to Fox. In brief summary, a first cover layer was unwound onto a moving collector surface, a commingled mix of thermoplastic meltblown fibers and polymeric sorbent particles was deposited onto the first cover layer, and a second cover layer was brought into contact with the meltblown fiber/sorbent particle layer while the meltblown fibers were still quite warm and sticky. The result was that the middle, meltblown fibers/sorbent particle layer was meltbonded to both the first and second cover layers.

The first cover layer was an electrostatically charged melt spunbond non-woven media of the general type disclosed in U.S. Pat. No. 7,947,142 to Fox. The first cover layer was quite stiff and exhibited the following properties (measured as a flat web): basis weight 107 g/m², solidity 10%, and Percent Penetration (DOP) of 20. The second cover layer was a spunbond polypropylene non-woven media of the general type described in U.S. Provisional Patent Application No. 61/873,110 to Berrigan. The second cover layer had minimal stiffness, had a basis weight of 44 g/m², and exhibited 0.34 mm H₂O airflow resistance at 14 cm/s test velocity. The meltblown fibers were made of the thermoplastic elastomer available from Dow under the trade designation VERSIFY 4301; under the meltblowing conditions used, the meltblown fibers made up approximately 16% by weight of the middle (meltblown fiber/sorbent) layer.

The resulting three-layer fibrous web exhibited an area weight of 533 g/m², an 8.41 mm H₂O airflow resistance at 14 cm/s test velocity, and a total sorbent content of 321 g/m². The web was formed into a pleated configuration using a folding-blade style pleater with a pleat height of 25 mm and a pleat spacing of 12.5 mm. The web was directly pleatable as made and did not require the lamination of any reinforcing layers (e.g. wire mesh) to successfully form and hold the pleated shape, aside from thin strips attached to the pleat tips used to maintain consistent pleat spacing. The majority of the web stiffness appeared to be contributed by the first cover layer.

Figure 11:
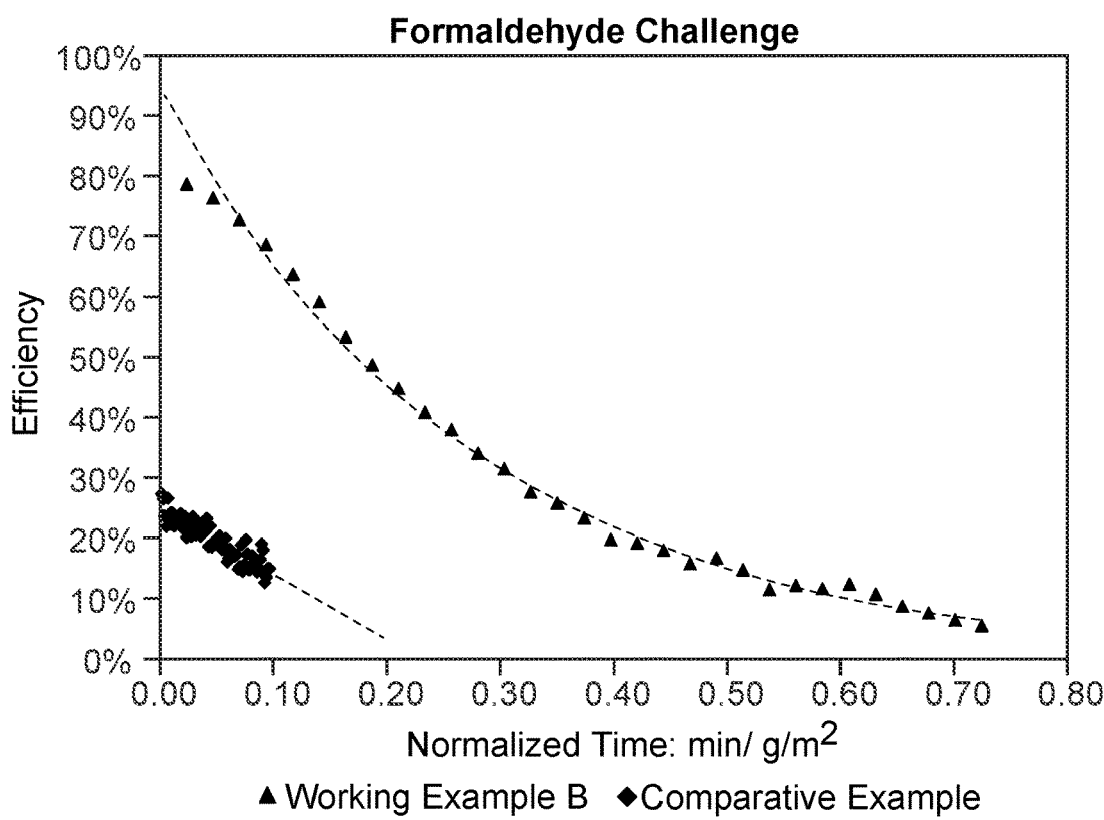
FIG. 11 presents formaldehyde capture efficiency data for another Working Example and the Comparative Example, with the x-axis normalized by the mass per unit area of sorbent.

A formaldehyde capture efficiency test was performed on a pleated Working Example B air filter sample; results are shown in FIG. 11 along with the above-described Comparative Example (honeycomb-activated carbon). In this instance, the best fit to the Working Example B data was found with an exponentional curve rather than a linear fit. It was necessary to extrapolate the honeycomb (Comparative Example) data to the point when the formaldehyde capture efficiency had dropped to 5%; however, for Working Example B actual data was obtained to this point so little or no extrapolation was necessary.

TABLE B

| Item | Units | Comparative Example | Working Example B |
|---|---|---|---|
| Test Area | m$^2$ | 0.0053 | 0.0053 |
| Formaldehyde Capacity | g/m$^2$ | 30.1 | 91.8 |
| Sorbent Weight | g/m$^2$ | 5600 | 1284 |
| Sorbent Capacity | Mass % | 0.54% | 7.1% |

Working Example C

A batch of precursor polymeric material was made in generally similar manner as described above for Working Example A. Differences were that the batch size was much smaller (the procedure being performed in a 300 cc vessel rather than in a 2.0 L vessel) and was performed at higher percent solids; however, the monomer composition was the same (34 wt. % divinylbenzene, 57.5 wt. % maleic anhydride, and 8.5 wt. % styrene-type monomers).

In a 32 ounce jar, 115 mL (1.72 moles) of EDA was dissolved in 230 mL of EtOH. To this solution was added 17.5 grams of the polymeric precursor material (sieved to 8×12 mesh). The jar was capped and placed in a sand bath at 80° C. This suspension was heated at this elevated temperature for 18 hours. The solid was isolated by vacuum filtration and washed with EtOH. The solid was placed in an 8 ounce jar, and 200 mL of EtOH was added to the jar. The solid was allowed to stand in the EtOH for 4 hours. The solid was again isolated by vacuum filtration and washed with EtOH. The solid was then dried under high vacuum at 80° C. for 8 hours. This product (polymeric sorbent) had a BET specific surface area (SA$_{BET}$) in the range of approximately 140 m$^2$/gram and a total pore volume in the range of approximately 0.17 cm$^3$/gram (p/p° equal to 0.98).

A netting was obtained from Delstar Technologies under the trade designation DELNET R0412-10PR; the netting was reported to have a basis weight of 60 g/m$^2$. The netting comprised two sets of filaments oriented substantially perpendicular to each other, to form an array of generally rectangular through-apertures (openings) each with an approximate dimension of 1.7×0.7 mm. A pressure-sensitive adhesive precursor (coating solution) was applied to both sides of the netting and the solvent was dried to leave (an acrylic-based) PSA on each side of the netting at a basis weight of approximately 30 g/m$^2$ on each side. The coated netting was also formed into a pleated form on a folding-blade style pleater with a pleat height of 25 mm and a pleat spacing of 12.5 mm. After pleating was finished, sorbent particles were manually sprinkled onto both sides of the pleated netting so that sorbent particles became adhesively attached to the PSA present on the major surfaces of the pleated netting. The sorbent was provided at a basis weight of approximately 800 g/m$^2$ (counting the sorbent particles on both sides).

Figure 12:
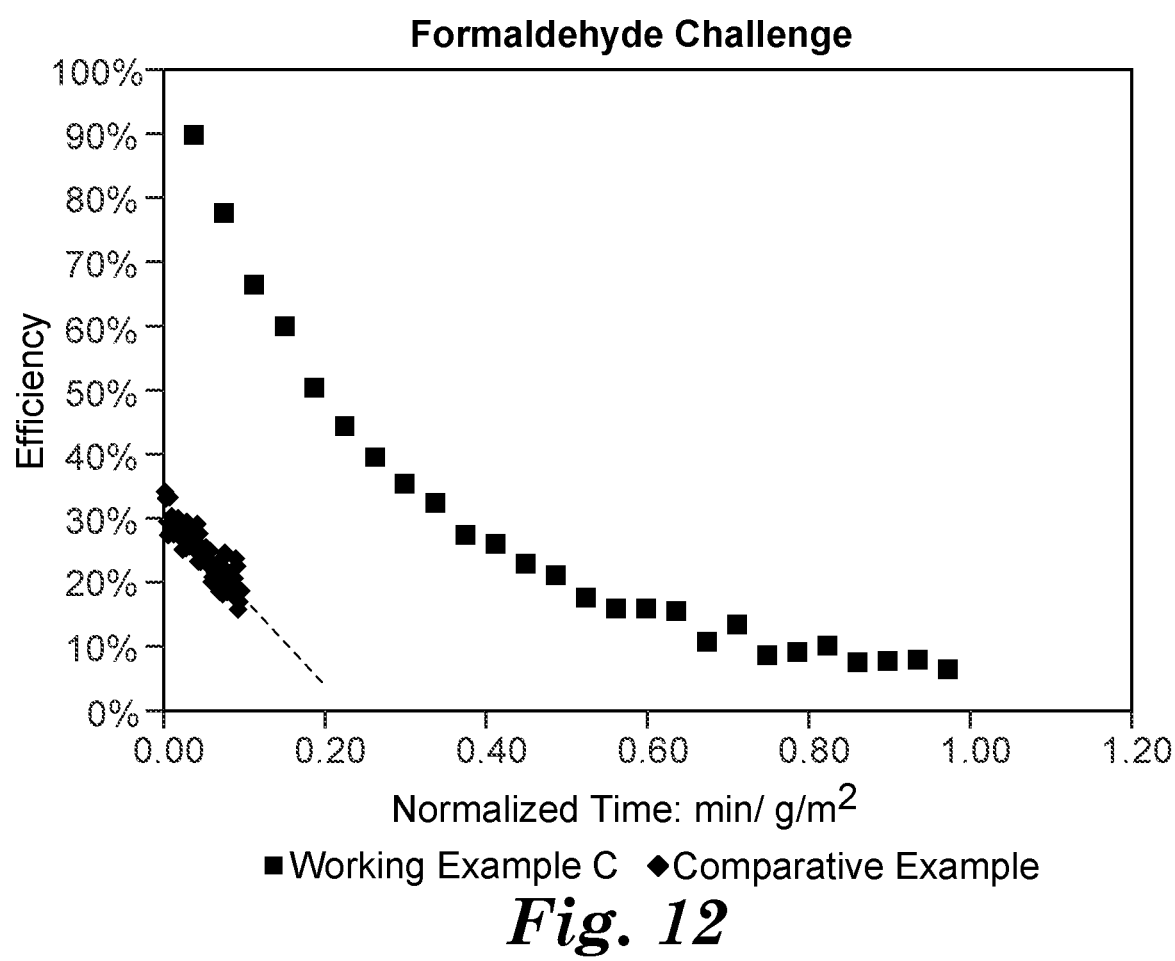
FIG. 12 presents formaldehyde capture efficiency data for another Working Example and the Comparative Example, with the x-axis normalized by the mass per unit area of sorbent.

A formaldehyde capture efficiency test was performed on a pleated Working Example C air filter sample; results are shown in FIG. 12 along with the above-described Comparative Example (honeycomb-activated carbon). It was necessary to extrapolate the honeycomb (Comparative Example) data to the point when the formaldehyde capture efficiency had dropped to 5%; however, for Working Example C actual data was obtained to this point so little or no extrapolation was necessary.

TABLE C

| Item | Units | Comparative Example | Working Example C |
|---|---|---|---|
| Test Area | m$^2$ | 0.0053 | 0.0053 |
| Formaldehyde Capacity | g/m$^2$ | 30.1 | 55.0 |
| Sorbent Weight | g/m$^2$ | 5600 | 797 |
| Sorbent Capacity | Mass % | 0.54% | 6.9% |

As demonstrated in the above Working Examples, the herein-disclosed polymeric sorbent particles, when disposed on a filter support to form an air filter, can exhibit an enhanced ability to capture formaldhyde, in comparison to e.g. a representative activated carbon sorbent. This has been demonstrated over a variety of filter supports (e.g., honeycomb, netting, and fibrous web), with the enhanced ability of the polymeric sorbent particles being consistent across all filter support formats, and being particularly evident e.g. in the Sorbent Capacity parameter.

This application claims incorporates by reference U.S. Provisional Patent Application No. 62/269,613 to Wendland, entitled Polymeric Sorbents for Aldehydes. That application contains (in addition to Working Example 14 which composition and procedures are similar to those used in the above Working Examples) numerous other Working Examples in which polymeric sorbents were made using a variety of monomer ratios (e.g., of divinylbenzene, maleic anhydride, and stryene-type monomers), using a variety of amines (e.g., ammonium hydroxide, hydrazine monohydrate, ethylene diamine, and N,N'-dimethylethylene-diamine), and at various reaction conditions. Although those Working Examples are not reproduced in this document for reasons of brevity, the characterizations of those Working Example polymeric sorbents (in terms of e.g. porosity, surface area, total pore volume, and in particular the adsorption of formaldehyde) in the '613 application would lead the skilled person to expect that the properties (in particular the enhanced ability to sorb formaldehyde) displayed by those Working Example sorbents would be similarly exhibited were these materials to be disposed on any suitable filter support in the manner disclosed herein.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

What is claimed is:

1. An air filter comprising a filter support that supports polymeric sorbent particles, wherein the polymeric sorbent comprises a reaction product of:
   (a) a precursor polymeric material comprising a polymerized product of a polymerizable composition comprising
      (1) 8 to 65 weight percent maleic anhydride based on the total weight of monomers in the polymerizable composition;
      (2) 30 to 85 weight percent divinylbenzene based on the total weight of monomers in the polymerizable composition; and
      (3) 0 to 40 weight percent of a styrene-type monomer based on the total weight of monomers in the polymerizable composition, wherein the styrene-type monomer is styrene, an alkyl-substituted styrene, or a combination thereof; and
   (b) a nitrogen-containing compound that is selected from ammonia, a compound having a single primary amino group (—$NH_2$), or a compound having at least two amino groups of formula —NHR where R is hydrogen or alkyl,
   and wherein the polymeric sorbent is present in the form of porous particles.

2. The air filter of claim 1 wherein the filter support comprises a substrate with at least one major surface with at least some polymeric sorbent particles disposed thereon.

3. The air filter of claim 2 wherein the polymeric sorbent particles are present substantially as a monolayer on the major surface of the substrate.

4. The air filter of claim 1 wherein the filter support comprises a porous, air-permeable material with polymeric sorbent particles disposed on a major surface thereof and/or with polymeric sorbent particles disposed within the interior of the material at least in a location proximate the major surface of the material.

5. The air filter of claim 4 wherein polymeric sorbent particles are disposed throughout the interior of the porous, air-permeable material.

6. The air filter of claim 1 wherein the air filter consists essentially of the filter support and the polymeric sorbent particles supported by the filter support.

7. The air filter of claim 1 wherein the filter support comprises a sheet-like material that exhibits a major plane and that exhibits a thickness of less than about 3 mm and that is configured to allow airflow through the filter support at least in a direction at least generally perpendicular to the major plane of the sheet-like material.

8. The air filter of claim 1 wherein the filter support comprises a netting with a major surface with at least some polymeric sorbent particles adhesively attached thereto.

9. The air filter of claim 1 wherein the filter support comprises a fibrous web that exhibits an interior and wherein the polymeric sorbent particles are disposed within at least portions of the interior of the web.

10. The air filter of claim 9 wherein the polymeric sorbent particles are disposed throughout an interior of the fibrous web.

11. The air filter of claim 9 wherein the web is a nonwoven fibrous web.

12. The air filter of claim 11 wherein the nonwoven fibrous web is a meltblown web.

13. The air filter of claim 9 wherein at least some fibers of the fibrous web are each bonded to at least one polymeric sorbent particle.

14. The air filter of claim 1 wherein the filter support is one layer of a multilayer, air-permeable assembly.

15. The air filter of claim 14 wherein the multilayer air-permeable assembly includes at least one layer that is not the same layer as the filter support and that is a particle-filtration layer.

16. The air filter of claim 15 wherein the particle-filtration layer comprises electret moieties.

17. The air filter of claim 1 wherein the nitrogen-containing compound is covalently attached to the polymeric sorbent.

18. The air filter of claim 1 wherein the filter support is pleated.

19. The air filter of claim 1 wherein the air filter is a framed air filter that is configured to be inserted into an air filter receptacle of an air-handling apparatus chosen from the group consisting of a forced air heating unit, a forced air cooling unit, a forced-air heating/cooling unit, a room air purifier, and a cabin air filtration unit for a motor vehicle.

20. The air filter of claim 1 wherein the filter support comprises a honeycomb with through-apertures within which sorbent particles are disposed.

21. The air filter of claim 1 wherein the filter support provides a layer of a filtering face-piece respirator.

22. The air filter of claim 21 wherein the filtering face-piece respirator is chosen from the group consisting of flat-fold respirators and molded respirators.

23. The air filter of claim 1 wherein the filter support comprises a container with an interior within which polymeric sorbent particles are disposed, and with at least one air inlet and at least one air outlet.

24. The air filter of claim 23 wherein the filter support comprises a filter cartridge.

25. The air filter of claim 24 wherein the filter cartridge is configured to be used with a personal protection device chosen from the group consisting of half-face negative-pressure respirators, full-face negative-pressure respirators, escape hoods, and powered air-purifying respirators.

26. A method of capturing at least some of an aldehyde from air, the method comprising:
   positioning the air filter of claim 1 so that the polymeric sorbent particles are exposed to the air, and,
   sorbing at least some of the aldehyde that is present in the air, onto the polymeric sorbent particles
   wherein the aldehyde is of Formula (I)

$$R_2\text{—(CO)—H} \tag{I}$$

wherein $R_2$ is hydrogen, alkyl, vinyl, or aryl and wherein the molecular weight of the aldehyde of Formula (I) is no greater than 200 grams/mole.

27. The method of claim 26, wherein $R_2$ is hydrogen or methyl.

28. The method of claim 26, wherein the filter support exhibits a major surface and wherein the air is present in the form of an airstream moving in a direction that is at least generally aligned with a plane of the major surface of the filter support.

29. The method of claim 26 wherein the filter support allows airflow therethrough and wherein the air is present in the form of an airstream that passes through at least a portion the filter support in a direction at least generally perpendicular to a major surface of the filter support.

30. A method of making an air filter comprising a filter support that comprises polymeric sorbent particles, the method comprising:
   (a) providing a precursor polymeric material comprising a polymerized product of a polymerizable composition comprising
(1) 8 to 65 weight percent maleic anhydride based on the total weight of monomers in the polymerizable composition;
(2) 30 to 85 weight percent divinylbenzene based on the total weight of monomers in the polymerizable composition; and
(3) 0 to 40 weight percent of a styrene-type monomer based on the total weight of monomers in the polymerizable composition, wherein the styrene-type monomer is styrene, an alkyl-substituted styrene, or a combination thereof; and
   (b) reacting the precursor polymeric material with a nitrogen-containing compound that is selected from ammonia, a compound having a single primary amino group (—$NH_2$), or a compound having at least two amino groups of formula —NHR where R is hydrogen or alkyl, to form the polymeric sorbent, wherein the polymeric sorbent has a covalently attached nitrogen-containing group and is in the form of particles;
and,
   (c) supporting the polymeric sorbent particles on a filter support.

* * * * *